US010306255B2

(12) United States Patent
Okajima et al.

(10) Patent No.: US 10,306,255 B2
(45) Date of Patent: May 28, 2019

(54) IMAGE DECODING DEVICE, IMAGE DECODING METHOD, AND INTEGRATED CIRCUIT

(71) Applicant: SOCIONEXT INC., Kanagawa (JP)

(72) Inventors: Kazunori Okajima, Osaka (JP); Satoshi Yamaguchi, Hyogo (JP)

(73) Assignee: SOCIONEXT INC., Kanagawa (JP)

( * ) Notice: Subject to any disclaimer, the term of this patent is extended or adjusted under 35 U.S.C. 154(b) by 109 days.

(21) Appl. No.: 15/274,877

(22) Filed: Sep. 23, 2016

(65) Prior Publication Data
US 2017/0013270 A1 Jan. 12, 2017

Related U.S. Application Data

(63) Continuation of application No. PCT/JP2014/005790, filed on Nov. 18, 2014.

(30) Foreign Application Priority Data

Mar. 25, 2014 (JP) ................................ 2014-062418

(51) Int. Cl.
*H04N 19/513* (2014.01)
*H04N 19/176* (2014.01)
*H04N 19/119* (2014.01)

(52) U.S. Cl.
CPC ......... *H04N 19/513* (2014.11); *H04N 19/119* (2014.11); *H04N 19/176* (2014.11)

(58) Field of Classification Search
None
See application file for complete search history.

(56) References Cited

U.S. PATENT DOCUMENTS

2006/0239354 A1 10/2006 Amano et al.
2013/0028329 A1\* 1/2013 Lou ...................... H04N 19/176
375/240.18
(Continued)

FOREIGN PATENT DOCUMENTS

JP 2006-311526 A 11/2006
JP 2006311526 A \* 11/2006 ............... H04N 7/32
(Continued)

OTHER PUBLICATIONS

Series H: Audiovisual and Multimedia Systems 'Infrastructure of audiovisual services—Coding of moving video',[online]. International Telecommunication Union, Recommendation ITU-T, H.265; Apr. 2013; [retrieved on Mar. 17, 2014]. Retrieved from the Internet: <URL:http://www.itu.int/rec/dologin_pub.asp?lang=e&id=T-REC-H.265-201304-I!!PDF-E&type=items>.
(Continued)

*Primary Examiner* — Reza Aghevli
(74) *Attorney, Agent, or Firm* — McDermott Will & Emery LLP

(57) ABSTRACT

A motion compensator includes a divider, a frame memory transfer controller, and a motion compensation processor. Based on information about a coding unit CU and prediction unit PU provided by a decoder, the divider determines whether or not to divide the PU. Next, based on a motion vector of the PU yet to be divided, reference image information, and information about divided blocks locations, the frame memory transfer controller determines the storage location of the reference image of a reference picture in a frame memory on the basis of each of the blocks divided, thereby obtaining reference image data. The motion compensation processor performs motion compensation operation on a motion compensation control block basis to generate a predicted image. Then, a reconstructor obtains a (Continued)

restored image based on a residual image generated by an inverse frequency transformer.

12 Claims, 27 Drawing Sheets

(56) References Cited

U.S. PATENT DOCUMENTS

| | | | | |
|---|---|---|---|---|
| 2013/0064294 A1* | 3/2013 | Sole Rojals | ......... | H04N 19/176 375/240.12 |
| 2013/0243087 A1* | 9/2013 | Lee | ....................... | H04N 19/593 375/240.12 |
| 2013/0315312 A1* | 11/2013 | Amano | ................. | H04N 19/176 375/240.16 |
| 2014/0307801 A1* | 10/2014 | Ikai | ......................... | H04N 19/91 375/240.18 |
| 2014/0341284 A1* | 11/2014 | Kim | ....................... | H04N 19/52 375/240.12 |
| 2016/0044310 A1* | 2/2016 | Park | ....................... | H04N 19/176 375/240.12 |
| 2017/0142419 A1* | 5/2017 | Kim | ....................... | H04N 19/52 |
| 2017/0142420 A1* | 5/2017 | Kim | ....................... | H04N 19/52 |

FOREIGN PATENT DOCUMENTS

| | | |
|---|---|---|
| WO | 2013/076888 A1 | 5/2013 |
| WO | 2013/076897 A1 | 5/2013 |

OTHER PUBLICATIONS

International Search Report and Written Opinion issued in International Patent Application No. PCT/JP2014/005790, dated Feb. 3, 2015; with English translation.

Japanese Office Action issued in Japanese Application No. 2016-509615 dated Jun. 19, 2018 (with partial English translation).

Chinese Office Action dated Aug. 24, 2018 for corresponding Chinese Application No. 201480077416.1 (with partial English translation).

"High efficiency video coding: Series H: Audiovisual and Multimedia Systems," Recommendation ITU-T H.265, Telecommunication Standardization Sector of ITU; Apr. 2013.

Notice of Reasons for Rejection issued in Japanese Patent Application No. 2016-509615, dated Dec. 8, 2018; with partial English translation.

* cited by examiner

FIG. 25

| CU SIZE | PartMode | | | | | | | |
|---|---|---|---|---|---|---|---|---|
| | Part_2Nx2N | Part_2NxN | Part_Nx2N | Part_NxN | Part_2NxnU | Part_2NxnD | Part_nLx2N | Part_nRx2N |
| 64x64 | 64x64 | 64x32 | 32x64 | 32x32 | 64x16 / 64x48 | 64x48 / 64x16 | 16x64 / 48x64 | 48x64 / 16x64 |
| 32x32 | 32x32 | 32x16 | 16x32 | 16x16 | 32x8 / 32x24 | 32x24 / 32x8 | 8x32 / 24x32 | 24x32 / 8x32 |
| 16x16 | 16x16 | 16x8 | 8x16 | 8x8 | 16x4 / 16x12 | 16x12 / 16x4 | 4x16 / 12x16 | 12x16 / 4x16 |
| 8x8 | 8x8 | 8x4 | 4x8 | — | — | — | — | — |

FIG. 26

TU SIZE

32x32  16x16  8x8  4x4

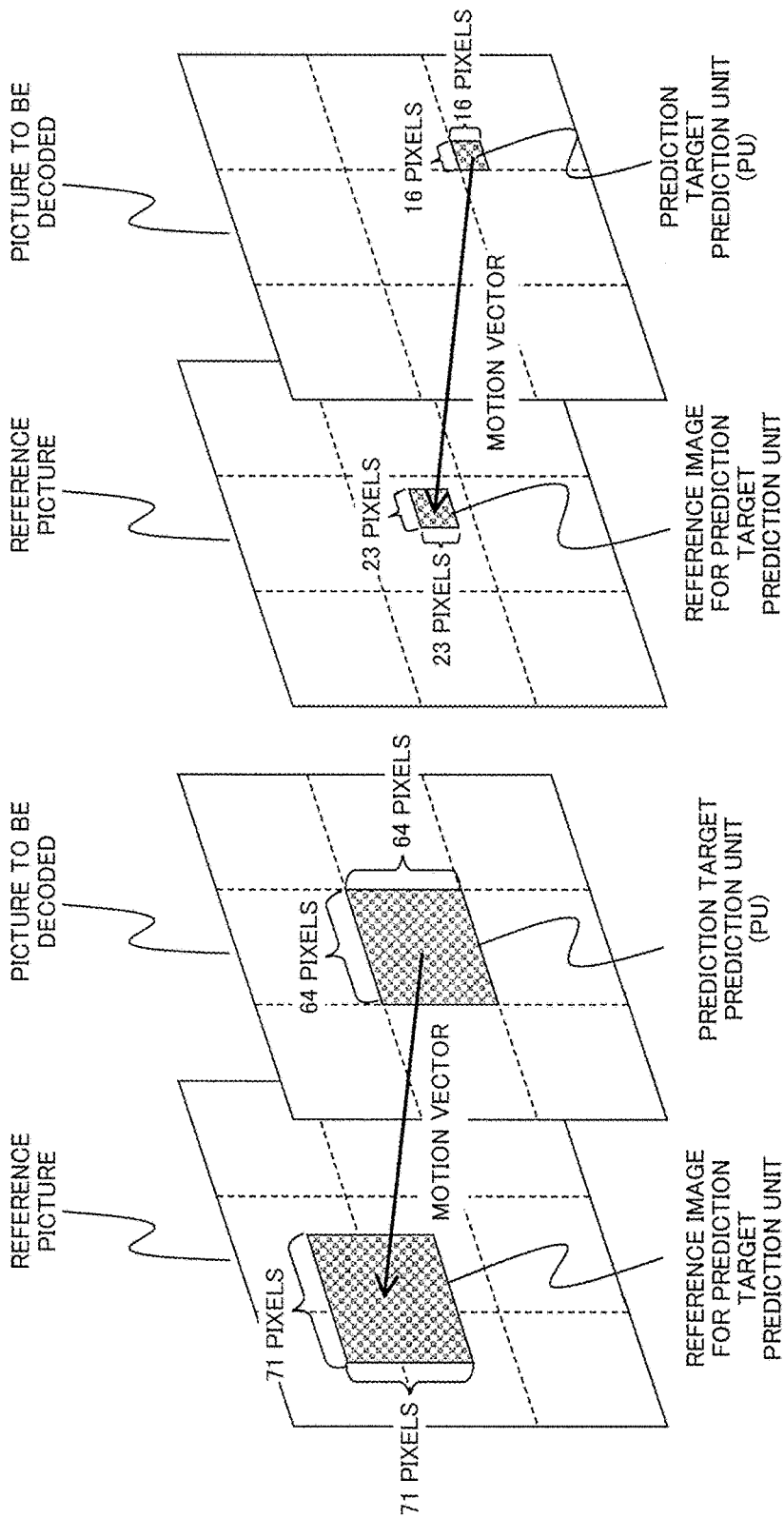

IMAGE DECODING DEVICE, IMAGE DECODING METHOD, AND INTEGRATED CIRCUIT

CROSS-REFERENCE TO RELATED APPLICATION

This is a continuation of International Application No. PCT/JP2014/005790 filed on Nov. 18, 2014, which claims priority to Japanese Patent Application No. 2014-062418 filed on Mar. 25, 2014. The entire disclosures of these applications are hereby incorporated by reference.

BACKGROUND

The present disclosure relates to an image decoding device and image decoding method for decoding a coded stream that has been coded by predictive processing.

As internet content providing technologies have been further advanced and widespread recently through smartphones, smart TVs, and various other mobile communications devices, a huge number of internet users are now provided with movies of even higher definition and even higher image quality. Meanwhile, there is a growing concern about an upsurge in communications traffic and a critical shortage of broadcast bands involved with the everlasting improvement in definition and image quality. Thus, to cope with such an upsurge in communications traffic and such a shortage of broadcast bands, the ITU-T (International Telecommunication Union Telecommunication Standardization Sector) issued in January 2013 a recommendation for an HEVC (High Efficiency Video Coding) standard as an international standardization organization standard H.265. According to the H.265 standard, a movie of the same quality can be compressed and transmitted in only half a data size compared to the H.264 (MPEG-4 AVC) standard. Thus, this H.265 standard has attracted a lot of attention lately as a viable solution for overcoming such an upsurge in communications traffic and such a shortage of broadcast bands. As for details of the H.265 standard, see, for example, 'SERIES H: AUDIOVISUAL AND MULTIMEDIA SYSTEMS Infrastructure of audiovisual services—Coding of moving video,' [online]. Recommendation ITU-TH.265, 04/2013, [retrieved on Mar. 17, 2014]. Retrieved from the Internet:
<URL:http://www.itu.int/rec/dologin_pub.asp?lang=e&id=T-REC-H.265-201304-I!!PDF-E&type=items>.

According to the H.265 standard, the size of a coding unit block is variable, unlike the conventional coding standard H.264. An image coder that adopts this technique may also perform coding on the basis of a block, of which the size is even larger than that (16 pixels×16 pixels) of a macroblock as a conventional coding unit, and therefore, is able to code a high-definition image appropriately.

An exemplary configuration for a picture and an exemplary format for a coded stream according to the H.265 standard will now be described with reference to FIG. 22. As shown in FIG. 22A, a coding unit (CU) is defined as a coding data unit. Just like a macroblock in the conventional image coding standard, this coding unit is a data unit that enables a switch of the modes of predictive coding from an intra-predictive coding, in which an intra-picture prediction is carried out, to an inter-predictive coding involving motion compensation. This coding unit is defined as the most basic coding block.

According to the Main Profile of the H.265 standard, this coding unit may have a size of 8×8 pixels, 16×16 pixels, 32×32 pixels, or 64×64 pixels.

According to the H.265 standard, each picture is coded on the basis of a pixel block called "CTU (coding tree unit)," which is the largest coding unit. The size of the CTU is not fixed unlike a macroblock (of 16×16 pixels) according to the H.264 or MPEG-2 standard, but may be selected while a sequence is being coded.

According to the Main Profile of the H.265 standard, the largest coding unit is defined to be a block consisting of 64×64 pixels. Furthermore, a single picture may be coded on the basis of a slice comprised of multiple CTUs. FIG. 22A illustrates an example in which a single picture is comprised of a single slice.

Note that a series of coding processing steps of the intra- or inter-predictive coding are performed on the basis of a CU, which is obtained by means of a recursive quadtree division of a single CTU.

As far as the intra-predictive coding and inter-predictive coding are concerned, each CU is supposed to be coded with the CU subdivided into multiple blocks called "prediction units (PUs)."

Meanwhile, the frequency transformation and quantization of a predictive differential signal are performed on the basis of a block called "transform unit (TU)," which is a frequency transformation unit.

FIG. 22B illustrates an exemplary format for a coded stream. A coded stream is generally comprised of a sequence header, a picture header, a slice header, and slice data. In an image coded stream coded compliant with the H.265 standard, for example, start codes (hereinafter referred to as "SC"), each indicating the beginning of a header, are added to the header.

The sequence header represents header information with respect to a sequence indicating a set of pictures. The picture header represents header information with respect to a single picture. The slice header represents header information with respect to slice data. The slice data is comprised of CU layer data representing a plurality of CTUs and a plurality of CUs. According to the H.265 standard, the sequence header is also called a "sequence parameter set (SPS)" and the picture header is also called a "picture parameter set (PPS)."

FIG. 23 illustrates an example in which a CTU is divided into CUs, PUs, and then TUs. Since the CTU is the largest CU before being subjected to the quadtree division, the CTU is supposed to be forming CU Layer 0. Every time a coding unit is subjected to a quadtree division, the division may be performed recursively into CU Layer 1, CU Layer 2, and so on.

Just as a CTU is divided into four CUs, each TU may also be subjected to a quadtree division recursively inside the CU.

Each PU is defined by division in a single prediction mode (which will be hereinafter referred to as a "PU division mode" defined by PartMode) with respect to a CU that cannot be divided any further. For example, if a CU consisting of 32×32 pixels is divided in Part_N×2N PU division mode, the CU consisting of 32×32 pixels is divided into two PUs each consisting of 16×32 pixels.

In the case of intra prediction, the PU division mode may be selected from two PU division modes Part_2N×2N and Part_N×N. In the case of inter prediction, on the other hand, the PU division mode may be selected from eight division modes in total, namely, four PU division modes Part_2N× 2N, Part_2N×N, Part_N×2N, and Part_N×N, each using blocks of the same size, and four division modes Part_2N× nU, Part_2N×nD, Part_nL×2N, and Part_nR×2N, each using two asymmetric blocks of different sizes (which are called "asymmetric motion partitions (AMPs)."

Note that each transform unit TU may be subjected to the quadtree division recursively independently of the PU division. Each transform unit TU may be comprised of N×N transform coefficients representing frequency components with respect to a predictive differential image (where N may be 4, 8, 16, or 32, for example).

FIGS. 24A and 24B illustrate an exemplary format for a coded stream representing its CU layer data and its underlying layer data according to the H.265 standard.

FIG. 24A illustrates configurations for a CU, a PU, and a TU. In the example illustrated in FIG. 24A, the CU and PU are each configured as a single block of 64×64 pixels, and the TU is configured as four blocks, each consisting of 32×32 pixels.

FIG. 24B illustrates an exemplary format for a coded stream representing its CU layer data and its underlying layer data according to the H.265 standard. Note that only reference signs to be used in the following description are shown in FIG. 24B. As for details, see the H.265 standard.

In FIG. 24B, the coding unit layer data corresponding to a single coding unit is comprised of a CU division flag and CU data (coding unit data). A CU division flag of "1" indicates that the given coding unit is divided into four. A CU division flag of "0" indicates that the given coding unit is not divided into four.

In the example illustrated in FIG. 24B, the coding unit consisting of 64×64 pixels is not divided, i.e., the CU division flag is "0." Furthermore, the CU data is comprised of a CU type, PU data representing a motion vector or an intra-picture prediction mode, and TU layer data 0 made up of transform units including coefficients. The size of the prediction unit is determined by the CU type.

The PU data includes not only the motion vector or intra-picture prediction mode but also a flag representing a reference picture (which will be hereinafter referred to as a "reference index") and information required to make inter prediction as well. The TU layer data 0 represents TU Layer 0 indicating a layer of the highest order, and is comprised of a TU division flag and TU Layer Data 1 just like the CU data.

Just like the CU division flag, a TU division flag of "1" indicates that the given transform unit is divided into four, while a TU division flag of "0" indicates that the given transform unit is not divided into four.

The TU Layer Data 1 is comprised of a TU division flag with respect to TU0, TU data (TU0), a TU division flag with respect to TU1, TU data (TU1), a TU division flag with respect to TU2, TU data (TU2), a TU division flag with respect to TU3, and TU data (TU3). Note that in the example illustrated in FIG. 24B, the TU division flag in the TU Layer Data 1 is "0."

In this case, no TU division flag will appear in any TU data but TU0 unless the TU data is decoded through the previous transform unit (e.g., through TU0 as for TU1). Thus, it can be seen that the size of each TU is not fixed.

FIG. 25 illustrates PU configurations which are selectable on a CU configuration basis in the inter-prediction mode according to the H.265 standard. For example, in the case of a 64×64 CU, a 64×64 PU, 64×32 PUs, 32×64 PUs, 32×32 PUs, a 64×16 PU and a 64×48 PU, or a 16×64 PU and a 48×64 PU may be selected according to the PartMode.

Then, on a prediction unit basis, a flag representing a motion vector or a reference picture (which will be hereinafter referred to as a "reference index") is specified in the case of inter prediction, and an intra-picture prediction mode is specified in the case of intra prediction.

Figure 26:
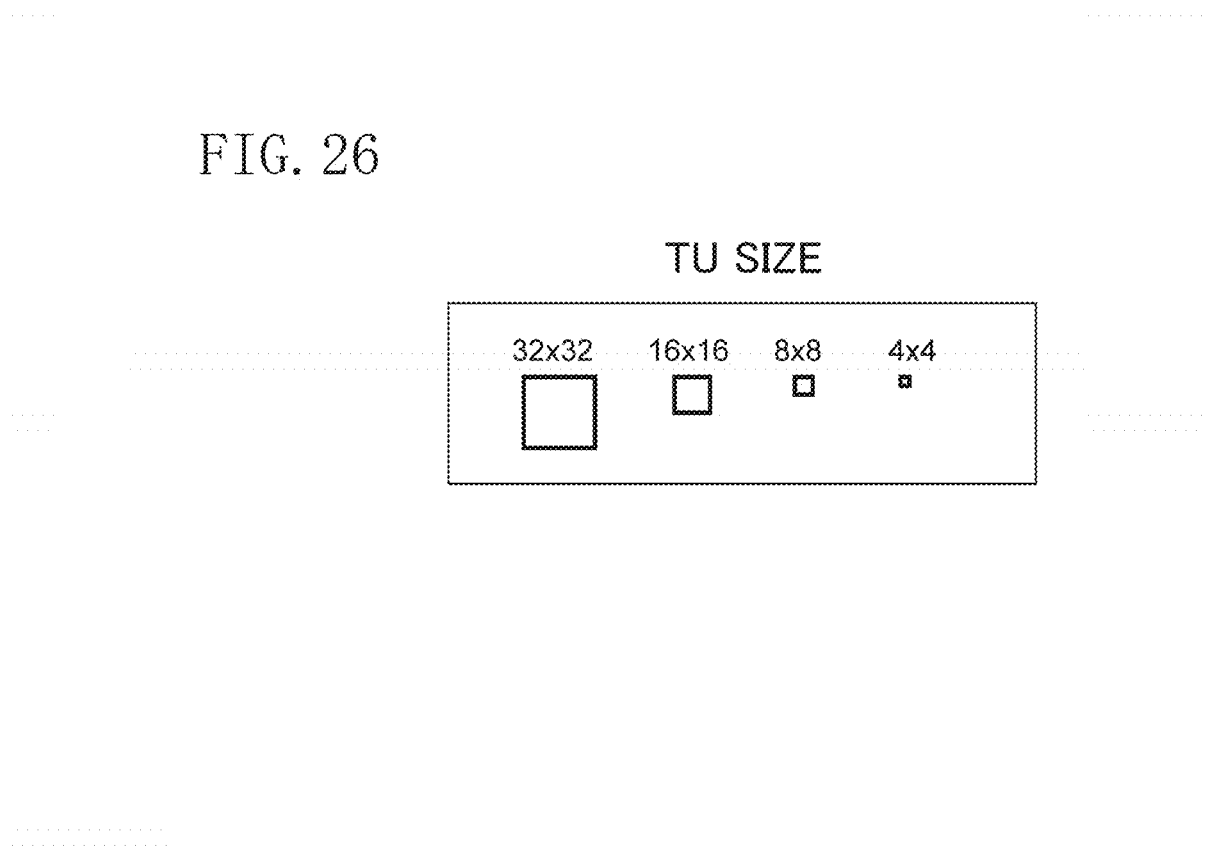

FIG. 26 illustrates TU configurations which are selectable according to the H.265 standard. Specifically, these TUs are configured as a 32×32 TU, a 16×16 TU, an 8×8 TU, and a 4×4 TU, respectively, and each have a square configuration.

In the case of inter prediction, a reference image needs to be obtained from the reference picture specified by the motion vector.

FIGS. 27A and 27B generally illustrate how to perform motion compensation processing. As shown in FIGS. 27A and 27B, the motion compensation processing is performed to generate a predicted image by extracting a part of a previously decoded picture, which is specified by a motion vector decoded from a coded stream and a reference index, and then subjecting that part of the picture to a filter operation. In the case of the H.265 standard, the filter operation of the motion compensation processing is carried out with a filter with eight TAPs at maximum.

For example, if an 8 TAP filter is used for a reference picture of a prediction unit to be predicted with a size of 64×64 pixels (i.e., a 64×64 PU), then 7 pixels are added both vertically and horizontally to the 64×64 pixels as shown in FIG. 27A. Specifically, from the prediction unit to be predicted, of which the origin is located at an integral position specified by the motion vector, three pixels are added to the left, four pixels are added to the right, three pixels are added to the top, and four pixels are added to the bottom. Thus, the reference image extracted from the reference picture consists of 71×71 pixels.

FIG. 27B illustrates a situation where the prediction unit to be predicted has a size of 16×16 pixels. If an 8 TAP filter is used, the reference image extracted from the reference picture consists of 23×23 pixels as in the case of the 64×64 PU. Note that if the motion vector specifies an integral position, the reference image of the prediction unit does not have to be subjected to any filter processing. Thus, the size of the reference image required may be the same as that of the prediction unit.

According to the H.264 standard, the prediction may be performed at most on a macroblock basis. Thus, to obtain a reference image of the same size according to the H.264 standard, a prediction unit consisting of at most 23×23 pixels (i.e., 529 pixels) needs to be used, compared to a prediction unit consisting of 16×16 pixels (i.e., 256 pixels) according to the H.265 standard. However, to obtain a reference image according to the H.265 standard, the reference image may consist of at most 71×71 pixels (i.e., 5041 pixels) with respect to a prediction unit consisting of 64×64 pixels (i.e., 4096 pixels). That is to say, according to the H.265 standard, the size of the data required for a single prediction unit increases approximately 9.5 fold. In addition, to obtain a reference picture from an external memory (e.g., from an external SDRAM), the external memory bus is occupied for approximately 9.5 times as long a time as in the H.264 standard. As a result, systems performing various types of processing other than decoding will be affected significantly. For example, the image output processing for display and other types of processing will fail, which is a problem.

This problem may be overcome by dividing each prediction unit into multiple units of the smallest size such as 4×4 pixels or 8×8 pixels as in Japanese Unexamined Patent Publication No. 2006-311526, which however adopts this processing for the purpose of fixing the size of a motion compensation block at a single size. Nevertheless, the smaller the size of the units divided, the larger the number of pixels required for the filter processing. Thus, according to the H.265 standard, for example, the ratio of the number of pixels required for the 8 TAP filter (i.e., the ratio of the number of pixels (i.e., seven pixels) to be added both vertically and horizontally to the size of each prediction unit) increases, which significantly affects the external memory bandwidth, and eventually causes a performance failure.

For example, to apply an 8 TAP filter to a prediction unit of 16×16 pixels, the reference image needs to consist of 23×23 pixels (i.e., 529 pixels). However, if the prediction unit of 16×16 pixels is divided into sixteen 4×4 pixel blocks, a reference image consisting of sixteen 11×11 pixel (121 pixels) blocks is required to apply an 8 TAP filter. Consequently, the size of the reference image required becomes 1936 pixels (=121 pixels×16), which is approximately 3.6 times as large as the number of pixels of the prediction unit yet to be divided. As a result, the external memory bandwidth will be affected significantly, which is not beneficial.

Alternatively, the problem may also be overcome by dividing the prediction unit PU along the edges of the transform unit TU as in PCT International Application Publication No. 2013/076888. However, if the TU has a size of 32×32 pixels, a reference image consisting of 39×39 pixels (i.e., 1521 pixels) needs to be obtained for a prediction unit of the same size, i.e., 32×32 pixels. Thus, compared to the reference image with a size of 23×23 pixels (529 pixels) with respect to the prediction unit consisting of 16×16 pixels, the data size needs to be increased approximately threefold. Thus, the external memory bus will be occupied for a much longer time, systems performing various types of processing other than decoding will be affected significantly, and the image output processing for display, in particular, and other types of processing will fail, which is a problem.

Furthermore, if the prediction unit PU is divided along the edges of the transform unit TU as in PCT International Application Publication No. 2013/076888, the prediction unit decoding processing depends on the size of the transform unit. Thus, the prediction unit decoding processing cannot be started until the size of the transform unit is determined. As a result, the prediction unit decoding processing is delayed, which is also a problem. Note that according to the H.265 standard, the size of the transform unit cannot be determined until the TU layer decoding processing advances to the layer of the lowest order.

In addition, in a situation where the prediction unit is divided along the edges of the transform unit as in PCT International Application Publication No. 2013/076888, if the prediction unit is divided into TUs of an even smaller size (e.g., 4×4 TUs), then the prediction unit also needs to be subjected to prediction processing depending on the transform unit. Thus, the decoding processing performance of the prediction processing deteriorates with respect to a prediction unit of a larger size than the transform unit, which is also a problem.

The percentage of the external memory bus occupied while the reference image is being obtained may be reduced if a motion compensation circuit is divided according to the smallest size of the prediction unit as in the known art described above.

However, the smaller the size of the units divided, the larger the number of pixels required to perform the filter processing during the prediction processing, thus causing an increase in the bandwidth of the external memory, which is a problem. Such an increase in the bandwidth of the external memory affects the overall system performance including image output processing, which leads to a failure of the application.

Conversely, the larger the prediction unit, the larger the area of the circuit performing the prediction processing, which is not beneficial, either. Furthermore, if the prediction processing is performed with the prediction unit divided and adjusted to the size of the transform unit, the prediction processing cannot be started until the size of the transform unit is determined, which is also a problem. That is to say, the prediction processing is delayed and cannot be done quickly enough.

In view of the foregoing background, it is therefore an object of the present disclosure to provide an image decoding device and image decoding method allowing a coded stream, which has been coded by subjecting a prediction unit to prediction processing, to be decoded quickly enough without occupying the external memory bus or increasing the bandwidth of the external memory and while reducing the area of the circuit on the chip.

SUMMARY

An image decoding device according to an aspect of the present disclosure decodes a coded stream which has been coded by performing coding processing on the basis of a coding unit. Each coding unit is comprised of: one or more prediction units functioning as units of prediction processing; or one or more transform units functioning as units of frequency transform processing. The coding processing includes: prediction processing to be performed on the one or more prediction units; and frequency transform processing to be performed on the one or more transform units. Specifically, the image decoding device includes: a divider dividing, if the size of each prediction unit is greater than a predetermined size, the prediction unit into a plurality of blocks irrespective of the size of each transform unit; a predicted image generator generating a predicted image of the prediction unit by performing decoding processing on the predicted image on the basis of each of the plurality of blocks obtained by dividing the prediction unit; and an image restorer obtaining a restored image based on the predicted image generated by the predicted image generator.

According to this aspect, even if the size of a given prediction unit is greater than a predetermined size, the size of the prediction unit may be reduced by dividing the prediction unit irrespective of the size of the transform unit.

As a result, this aspect also allows the decoding processing to be performed without occupying any external memory bus, increasing the bandwidth of any external memory, or increasing the area of any prediction processor circuit on the chip.

In one embodiment, the divider may divide the prediction unit to the predetermined size or less.

According to this embodiment, even if the size of a given prediction unit is greater than a predetermined size, the size of the prediction unit may be reduced by dividing the prediction unit to the predetermined size or less irrespective of the size of the transform unit.

As a result, this embodiment also allows the decoding processing to be performed without occupying any external memory bus, increasing the bandwidth of any external memory, or increasing the area of any prediction processor circuit on the chip.

In another embodiment, the divider may divide a single block, in which all of the one or more prediction units forming the coding unit are combined together, into four blocks, each having the same size, and may subdivide each of the divided blocks recursively such that the size of the subdivided block becomes equal to or smaller than the predetermined size for the divider.

According to this embodiment, even if the size of a given prediction unit is greater than a predetermined size, the size of the prediction unit may be reduced by dividing, irrespective of the size of the transform unit, a single block, in which all of the one or more prediction units are combined together, into four blocks of the same size, and by subdividing each of the divided blocks recursively such that the size of the subdivided block becomes equal to or smaller than the predetermined size.

As a result, this embodiment also allows the decoding processing to be performed without occupying any external memory bus, increasing the bandwidth of any external memory, or increasing the area of any prediction processor circuit on the chip.

In still another embodiment, the predicted image generator may generate the predicted image recursively and in a Z order based on the blocks that have been subdivided recursively by the divider.

According to this embodiment, even if the size of a given prediction unit is greater than a predetermined size, the decoding processing may be speeded up by dividing, irrespective of the size of the transform unit, a single block, in which all of the one or more prediction units are combined together, into four blocks of the same size, subdividing each of the divided blocks recursively such that the size of the subdivided block becomes equal to or smaller than the predetermined size, and generating the predicted image recursively and in a Z order based on the blocks that have been subdivided recursively.

As a result, this embodiment also allows the decoding processing to be performed quickly enough without occupying any external memory bus, increasing the bandwidth of any external memory, or increasing the area of any prediction processor circuit on the chip.

In yet another embodiment, the predetermined size for the divider may be 16 pixels×16 pixels.

According to this embodiment, even if the size of a given prediction unit is greater than 16 pixels×16 pixels, the size of the prediction unit may be reduced by dividing the prediction unit to a size of 16 pixels×16 pixels or less, irrespective of the size of the transform unit.

As a result, this embodiment also allows the decoding processing to be performed without occupying any external memory bus, increasing the bandwidth of any external memory, or increasing the area of any prediction processor circuit on the chip.

In yet another embodiment, the predicted image generator may generate the predicted image by obtaining previously decoded image data.

According to this embodiment, the predicted image may be generated by obtaining previously decoded image data. In addition, even if the size of a given prediction unit is greater than a predetermined size, the size of the prediction unit may be reduced by dividing the prediction unit irrespective of the size of the transform unit.

As a result, this embodiment also allows the decoding processing to be performed without occupying any external memory bus, increasing the bandwidth of any external memory, or increasing the area of any prediction processor circuit on the chip.

In yet another embodiment, the predicted image generator may generate the predicted image by retrieving previously decoded image data from an external memory.

According to this embodiment, the predicted image may be generated by retrieving previously decoded image data from an external memory. In addition, even if the size of a given prediction unit is greater than a predetermined size, the size of the prediction unit may be reduced by dividing the prediction unit irrespective of the size of the transform unit.

As a result, this embodiment also allows the decoding processing to be performed without occupying any external memory bus, increasing the bandwidth of any external memory, or increasing the area of any prediction processor circuit on the chip.

In yet another embodiment, the predicted image generator may generate the predicted image by performing motion compensation processing using a motion vector of the prediction unit based on the previously decoded image data.

According to this embodiment, the predicted image may be generated by performing motion compensation processing using a motion vector of the prediction unit based on the previously decoded image data. In addition, even if the size of a given prediction unit is greater than a predetermined size, the size of the prediction unit may be reduced by dividing the prediction unit irrespective of the size of the transform unit.

As a result, this embodiment also allows the decoding processing to be performed without occupying any external memory bus, increasing the bandwidth of any external memory, or increasing the area of any prediction processor circuit on the chip.

In yet another embodiment, the image restorer may obtain the restored image by adding a residual image subjected to inverse frequency transform processing.

According to this embodiment, the restored image may be obtained by adding a residual image subjected to inverse frequency transform processing to the predicted image. In addition, even if the size of a given prediction unit is greater than a predetermined size, the size of the prediction unit may be reduced by dividing the prediction unit irrespective of the size of the transform unit.

As a result, this embodiment also allows the decoding processing to be performed without occupying any external memory bus, increasing the bandwidth of any external memory, or increasing the area of any prediction processor circuit on the chip.

In yet another embodiment, the coded stream may have been coded according to the H.265 standard.

According to this embodiment, the coded stream may be restored according to the H.265 standard. In addition, even if the size of a given prediction unit is greater than a predetermined size, the size of the prediction unit may be reduced by dividing the prediction unit irrespective of the size of the transform unit.

As a result, this embodiment also allows the decoding processing to be performed without occupying any external memory bus, increasing the bandwidth of any external memory, or increasing the area of any prediction processor circuit on the chip.

An image decoding method according to another aspect of the present disclosure is designed to decode a coded stream which has been coded by performing coding processing on the basis of a coding unit. Each coding unit is comprised of: one or more prediction units functioning as units of prediction processing; or one or more transform units functioning as units of frequency transform processing. The coding processing includes: prediction processing to be performed on the one or more prediction units; and frequency transform processing to be performed on the one or more transform units. Specifically, the method includes the steps of: dividing, if the size of each prediction unit is greater than a predetermined size, the prediction unit into a plurality of blocks irrespective of the size of each transform unit; generating a predicted image of the prediction unit by performing decoding processing on the predicted image on the basis of each of the plurality of blocks obtained by dividing the prediction unit; and obtaining a restored image based on the predicted image generated in the step of generating the predicted image.

According to this aspect, even if the size of a given prediction unit is greater than a predetermined size, the size of the prediction unit may be reduced by dividing the prediction unit irrespective of the size of the transform unit.

As a result, this aspect also allows the decoding processing to be performed without occupying any external memory bus, increasing the bandwidth of any external memory, or increasing the area of any prediction processor circuit on the chip.

An integrated circuit according to still another aspect of the present disclosure decodes a coded stream which has been coded by performing coding processing on the basis of a coding unit. Each coding unit is comprised of: one or more prediction units functioning as units of prediction processing; or one or more transform units functioning as units of frequency transform processing. The coding processing includes: prediction processing to be performed on the one or more prediction units; and frequency transform processing to be performed on the one or more transform units.

Specifically, the integrated circuit includes: a divider dividing, if the size of each prediction unit is greater than a predetermined size, the prediction unit into a plurality of blocks irrespective of the size of each transform unit; a predicted image generator generating a predicted image of the prediction unit by performing decoding processing on the predicted image on the basis of each of the plurality of blocks obtained by dividing the prediction unit; and an image restorer obtaining a restored image based on the predicted image generated by the predicted image generator.

According to this aspect, even if the size of a given prediction unit is greater than a predetermined size, the size of the prediction unit may be reduced by dividing the prediction unit irrespective of the size of the transform unit.

As a result, this aspect also allows the decoding processing to be performed without occupying any external memory bus, increasing the bandwidth of any external memory, or increasing the area of any prediction processor circuit on the chip.

As can be seen from the foregoing description, an image decoding device according to the present disclosure may perform decoding processing, irrespective of the size of each transform unit, without occupying any external memory bus, increasing the bandwidth of any external memory, or increasing the area of any prediction processor circuit on the chip.

BRIEF DESCRIPTION OF THE DRAWINGS

FIG. 25 illustrates PU configurations which are selectable on a CU configuration basis in the inter-prediction mode according to the H.265 standard.

FIG. 26 illustrates TU configurations which are selectable according to the H.265 standard.

FIGS. 27A and 27B generally illustrate how to perform motion compensation processing.

DETAILED DESCRIPTION

Embodiments of the present disclosure will now be described with reference to the accompanying drawings.

First Embodiment

An image decoding device will be described as a first embodiment of the present disclosure.

Figure 1:
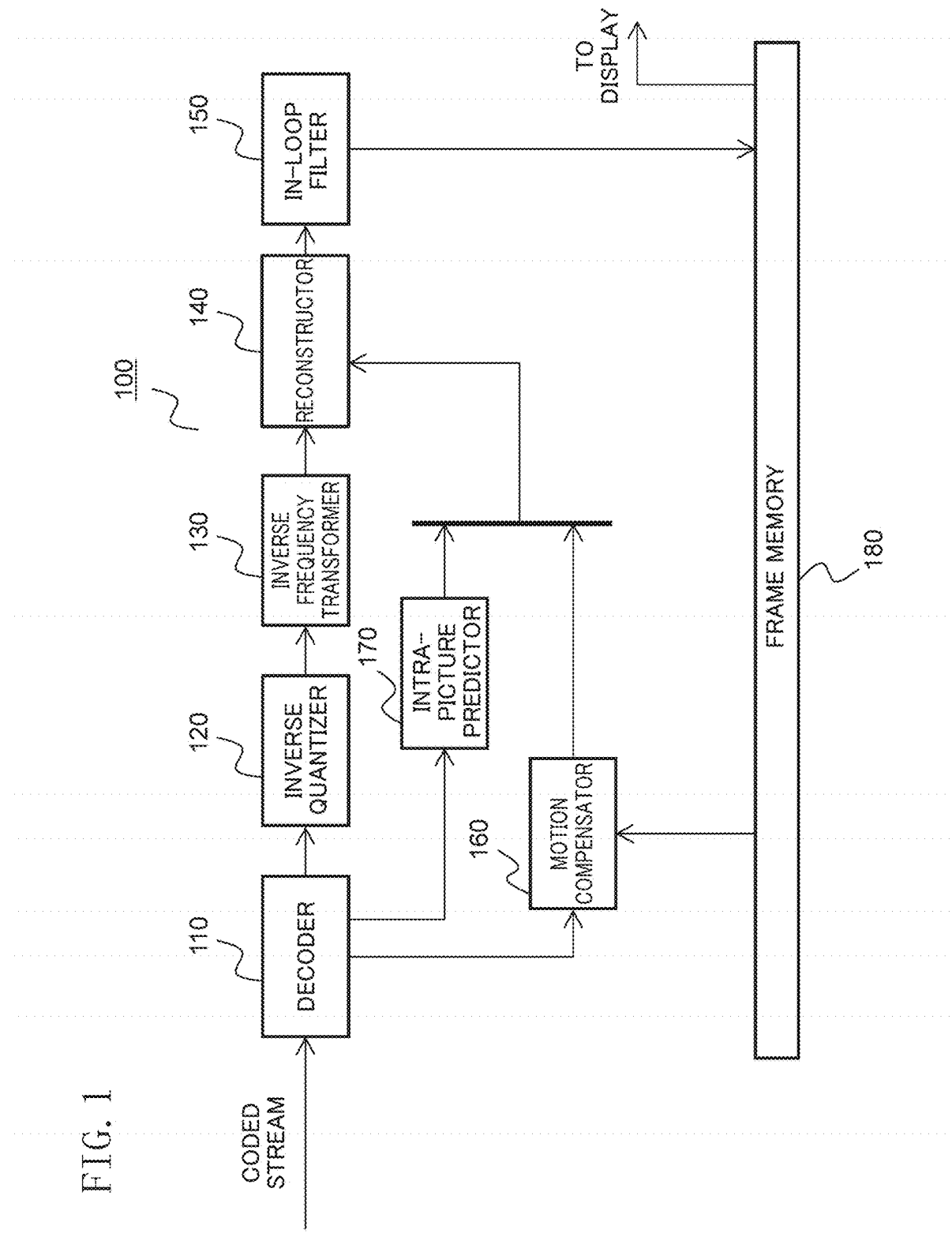
FIG. 1 is a block diagram illustrating a configuration for an image decoding device according to a first embodiment.

FIG. 1 is a block diagram illustrating a configuration for an image decoding device according to the first embodiment.

As shown in FIG. 1, the image decoding device 100 includes a decoder 110, an inverse quantizer 120, an inverse frequency transformer 130, a reconstructor 140, an in-loop filter 150, a motion compensator 160, an intra-picture predictor 170, and a frame memory 180. Basically, each of these blocks is supposed to perform conventional decoding processing according to the H.265 standard. The same or similar processing steps as/to conventional ones will be described just briefly.

If the coding unit (hereinafter referred to as "CU") of an incoming coded stream indicates inter prediction, the decoder 110 decodes the incoming coded stream, and outputs a motion vector and reference image information (e.g., a flag and reference index to identify a reference image) of a prediction unit (hereinafter referred to as "PU") and information about the CU or the PU (e.g., the size of the CU and the PU division mode PartMode) to the motion compensator 160. Note that the decoder 110 performs arithmetic decoding processing and variable-length decoding processing in accordance with the H.265 standard.

Based on the motion vector, reference image information, and information about the CU and PU that have been provided by the decoder 110, the motion compensator 160 determines the storage location of a reference image in the frame memory 180 and retrieves the reference image from the frame memory 180. The motion compensator 160 then carries out motion compensation on the PU based on the reference image retrieved to generate a predicted image and output the predicted image to the reconstructor 140.

Meanwhile, the decoder 110 decodes the coefficient data (e.g., a DCT coefficient and a transform coefficient) of the frequency components of a frequency transform unit (hereinafter referred to as "TU") and outputs the decoded coefficient data to the inverse quantizer 120. In response, the inverse quantizer 120 inversely quantizes the coefficient data provided by the decoder 110 and outputs the resultant data to the inverse frequency transformer 130. The inverse frequency transformer 130 performs, on a TU basis, an inverse frequency transform on the inversely quantized coefficient data provided by the inverse quantizer 120, and outputs the resultant data as a residual image to the reconstructor 140.

The reconstructor 140 adds together the residual image provided by the inverse frequency transformer 130 and the predicted image provided by the motion compensator 160, and outputs the resultant image as a reconstructed image to the in-loop filter 150.

The in-loop filter 150 subjects the reconstructed image provided by the reconstructor 140 to an in-loop filter (e.g., a deblocking filter or a sample adaptive offset filter (SAO)) and outputs the resultant image to the frame memory 180. Thereafter, the decoded image is output from the frame memory 180 to a display (not shown).

In a prediction unit which is an I-picture or intra-prediction block that uses no temporally different reference images, the intra-picture prediction mode calculated by the decoder 110 is output to the intra-picture predictor 170.

The intra-picture predictor 170 performs an intra-picture prediction based on the intra-picture prediction mode provided by the decoder 110 to generate a predicted image and output the predicted image to the reconstructor 140. Although not shown, the reconstructed image required for the intra-picture prediction may be obtained from the reconstructor 140.

As in the case of inter prediction, the reconstructor 140 adds together the residual image provided by the inverse frequency transformer 130 and the predicted image provided by the intra-picture predictor 170, and outputs the resultant image as a reconstructed image to the in-loop filter 150.

The processing to be performed by respective blocks that follow the in-loop filter 150 is the same as in the case of the inter prediction, and the description thereof will be omitted herein.

Next, the motion compensator 160 will be described in detail.

Figure 2:
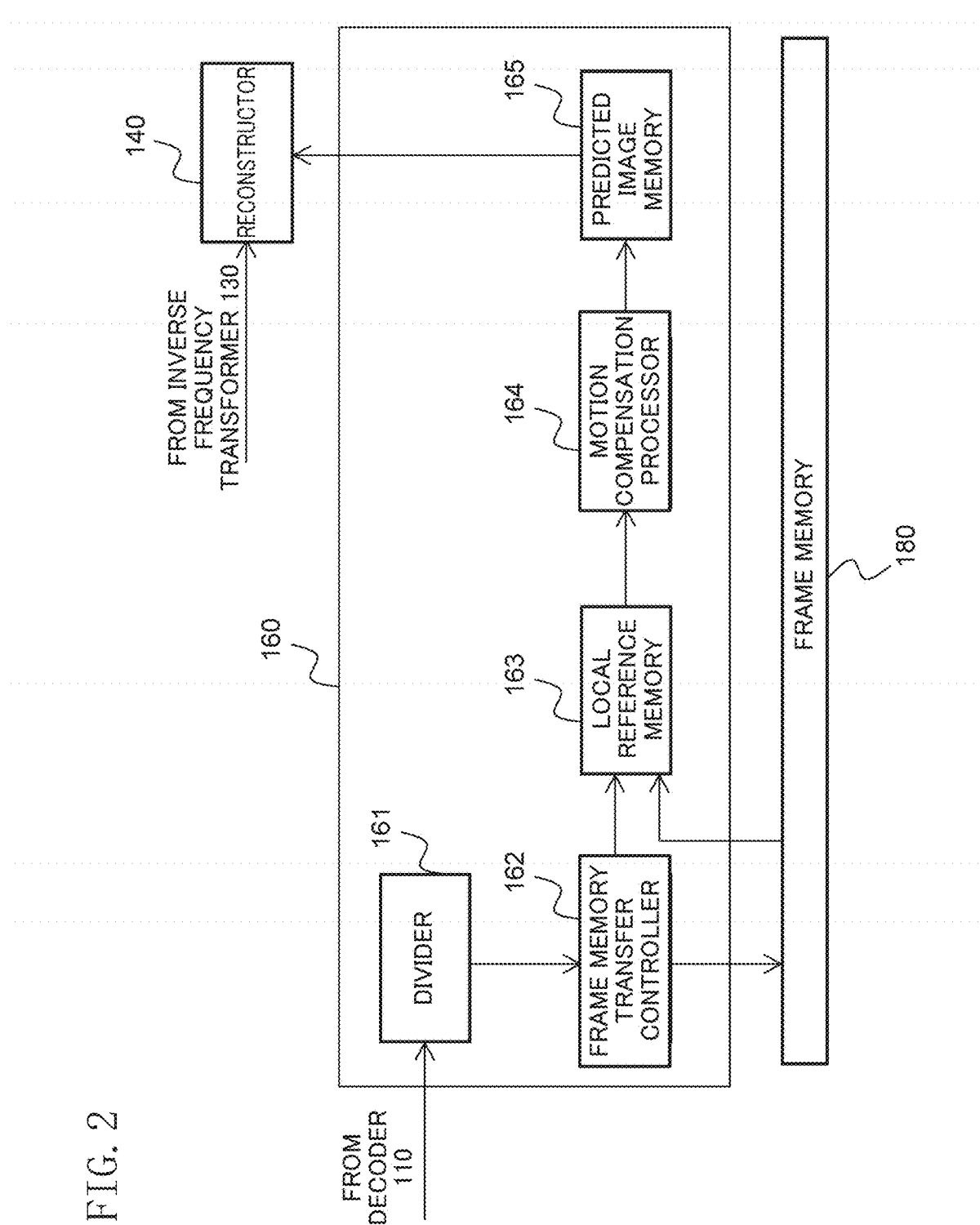
FIG. 2 is a block diagram illustrating a configuration for a motion compensator according to the first embodiment.

FIG. 2 is a block diagram illustrating a configuration for a motion compensator according to the first embodiment.

A divider 161 determines, by reference to information about the CU and PU provided by the decoder 110, whether or not to divide the PU. If the determination is made that the PU be divided, the divider 161 retains a motion vector of the PU yet to be divided, the reference image information, and information about the blocks divided on a divided block basis, and transfers the information about each divided block to the frame memory transfer controller 162 depending on the result of the division. Note that the method of dividing and the order of processing the divided blocks will be described in detail later. On the other hand, if the determination is made that the PU not be divided, the divider 161 transfers the motion vector of the PU, the reference image information, and the PU location information to the frame memory transfer controller 162.

To generate a predicted image based on the motion vector, the reference image information, and the block/PU location information provided by the divider 161, the frame memory transfer controller 162 determines the storage location of a reference image of a reference picture in the frame memory 180, retrieves reference image data from the frame memory 180, and transfers the reference image data to a local reference memory 163.

Based on the reference image data stored in the local reference memory 163, the motion compensation processor 164 performs motion compensation processing on a motion compensation control block basis to generate a predicted image and output the predicted image to a predicted image memory 165.

The reconstructor 140 adds together the predicted image stored in the predicted image memory 165 and the residual image provided by the inverse frequency transformer 130 and outputs the resultant image as a reconstructed image.

Figure 3:
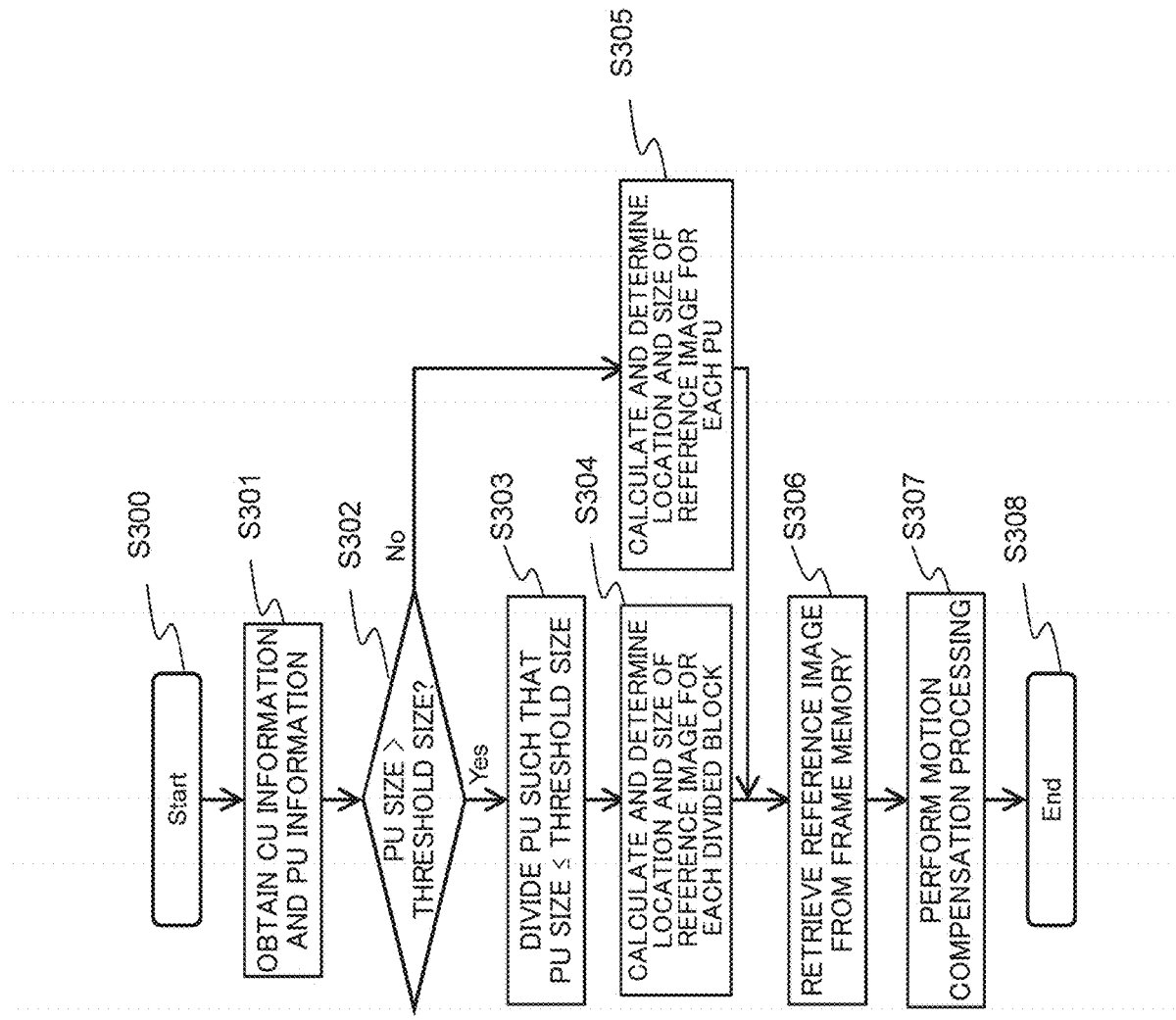
FIG. 3 is a flowchart showing the procedure of generating a predicted image according to the first embodiment.

FIG. 3 is a flowchart showing the procedure of generating a predicted image according to the first embodiment.

First, the decoder 110 outputs CU information and PU information, which have been derived from a coded stream, to the divider 161 (in Step S301).

Next, the divider 161 determines whether or not the PU size has exceeded a predetermined threshold size. If the answer to the question of Step 302 is YES, then the divider 161 divides the PU such that the size of the PU becomes equal to or smaller than the threshold size (in Step S303).

The frame memory transfer controller 162 calculates and determines the location and size of a reference image on the frame memory 180 for each of the divided blocks (in Step S304), retrieves, from the frame memory 180, reference image data to be used to perform motion compensation processing on the motion compensation target block, and transfers the reference image data to the local reference memory 163 (in Step S306).

On the other hand, if the determination is made by the divider 161 that the PU size does not exceed the predetermined threshold size (i.e., if the answer to the question of Step 302 is NO), then the frame memory transfer controller 162 calculates and determines the location and size of a reference image area specified by the motion vector on a PU basis (i.e., the location and size of reference image data to be used to perform motion compensation processing on the motion compensation target block)(in Step S305), retrieves a reference image from the frame memory 180, and then transfers the reference image to the local reference memory 163 (in Step S306).

The motion compensation processor 164 performs motion compensation processing on a motion compensation target block basis using the reference image data retrieved from the local reference memory 163, and outputs the predicted image thus generated to the predicted image memory 165 (in Step S307).

Next, it will be described in further detail how to divide a PU on a size-by-size basis in order to differentiate the method of the present disclosure more clearly from the conventional methods.

Figure 4:
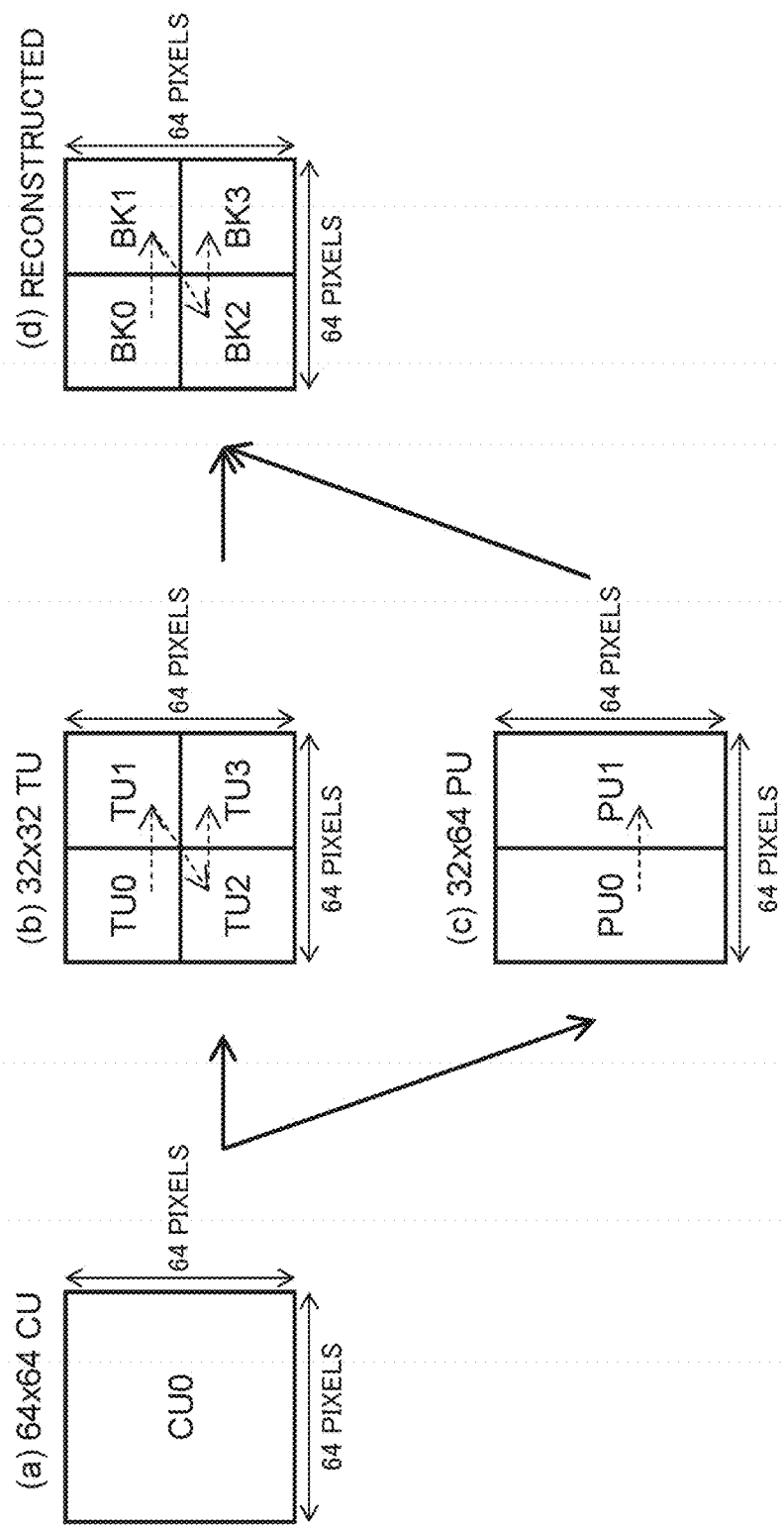
FIG. 4 illustrates exemplary block arrangements for a CU, PUs, TUs, and a reconstructed image in a situation where PU division according to the first embodiment is not carried out.

FIG. 4 illustrates exemplary block arrangements for a CU, PUs, TUs, and a reconstructed image in a situation where the PU division according to the first embodiment is not carried out.

Portion (a) of FIG. 4 illustrates an exemplary arrangement for a CU according to this embodiment. CU0 shown in portion (a) of FIG. 4 has a size of 64×64 pixels.

Portion (b) of FIG. 4 illustrates an exemplary arrangement of TUs in CU0 shown in portion (a) of FIG. 4. In portion (b) of FIG. 4, four transform units, each consisting of 32×32 pixels (such a TU will be hereinafter referred to as a "32×32 TU", and the same notation will apply to CUs and PUs as well) are identified by the reference signs TU0, TU1, TU2, and TU3, respectively, which are processed in this order. Examples of the processing to be performed on these four transform units TU0 to TU3 include inverse quantization and inverse frequency transform. In any case, the result is output as a residual image.

Portion (c) of FIG. 4 illustrates an exemplary arrangement of PUs in CU0 shown in portion (a) of FIG. 4. In portion (c) of FIG. 4, two 32×64 PUs are identified by the reference signs PU0 and PU1, respectively, which are also processed in this order.

Portion (d) of FIG. 4 illustrates an exemplary arrangement of blocks after CU0 shown in portion (a) of FIG. 4 has been divided. In portion (d) of FIG. 4, shown are four blocks BK0, BK1, BK2, and BK3, which are also processed in this order. Examples of the processing to be performed on these four blocks BK0-BK3 include reconstruction processing, in-loop filter processing, and storage processing to the frame memory 180. Although the divided blocks shown in portion (d) of FIG. 4 are supposed to each have the same size as TUs, the divided blocks may also each have the same size as PUs or any other arbitrary size as well.

Figure 5:
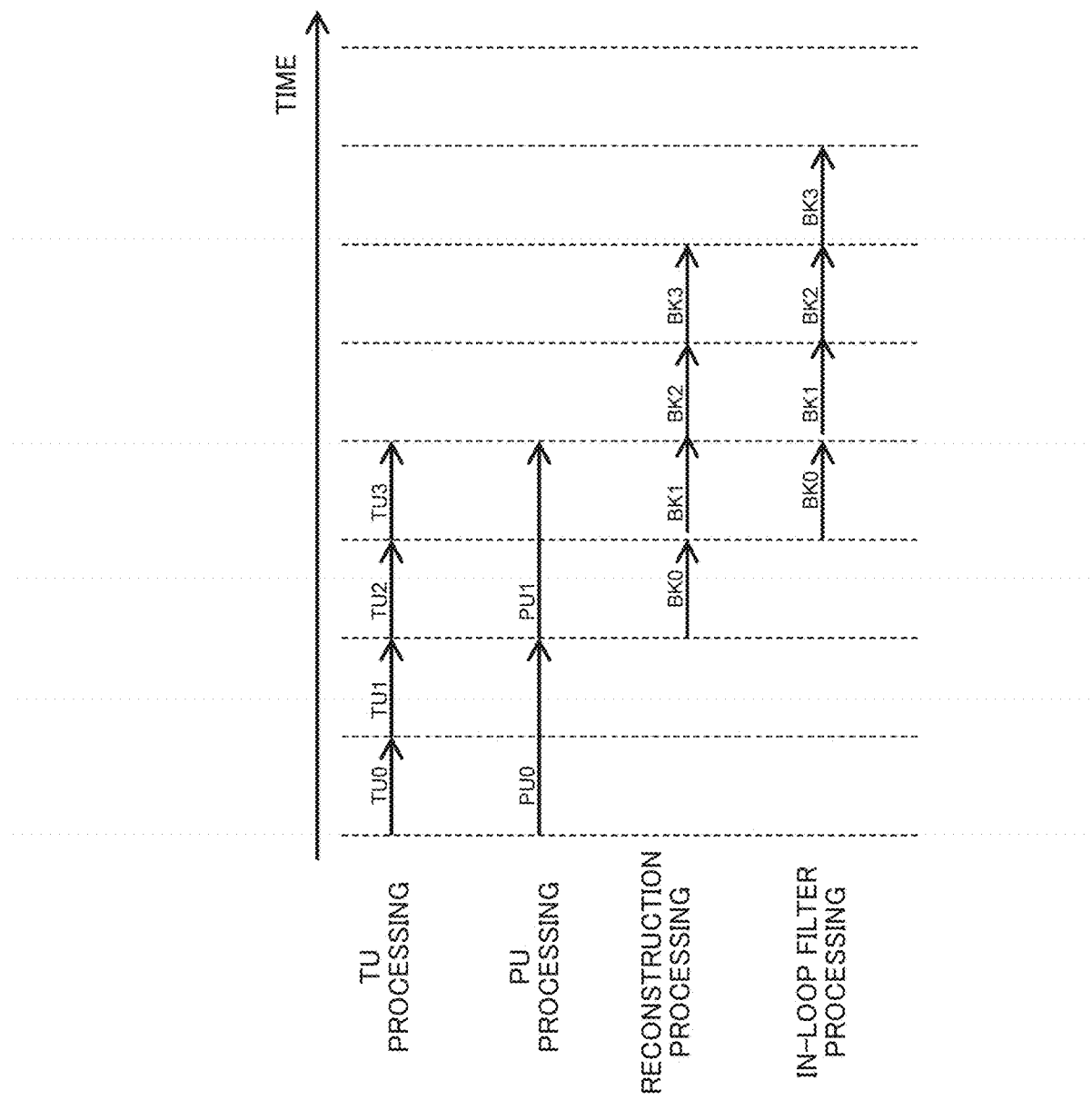
FIG. 5 is a timing chart showing how to perform pipeline processing in a situation where the PU division according to the first embodiment is not carried out.

FIG. 5 is a timing chart showing how to perform pipeline processing in a situation where the procedure shown in FIG. 3 is not applied to the CU, TUs, PUs, or reconstructed image shown in FIG. 4. In the example shown in FIG. 5, TU processing is carried out on transform units TU0, TU1, TU2, and TU3 in this order. Although not shown in FIG. 5 (and will not be shown in any of the timing charts to be referred to in the following description), decoding processing has already been carried out by the decoder 110 before the TU processing. In the meantime, PU processing is carried out in parallel on prediction units PU0 and PU1. After that, reconstruction processing is carried out on BK0, BK1, BK2, and BK3. Then in-loop filter processing is carried out on BK0-BK3.

In the example shown in FIG. 5, the reconstruction processing cannot be started until the PU processing on PU0 is finished and until the TU processing on TU0 is finished. That is to say, there is a time lag between a point in time when the TU processing on TU0 is finished and a point in time when the reconstruction processing may be started. In addition, since PU0 is configured as a 32×64 PU and since the frame memory transfer controller 162 retrieves a reference image consisting of as many as 39×71 pixels (i.e., 2769 pixels) from the frame memory 180, the external memory bus is occupied.

Figure 6:
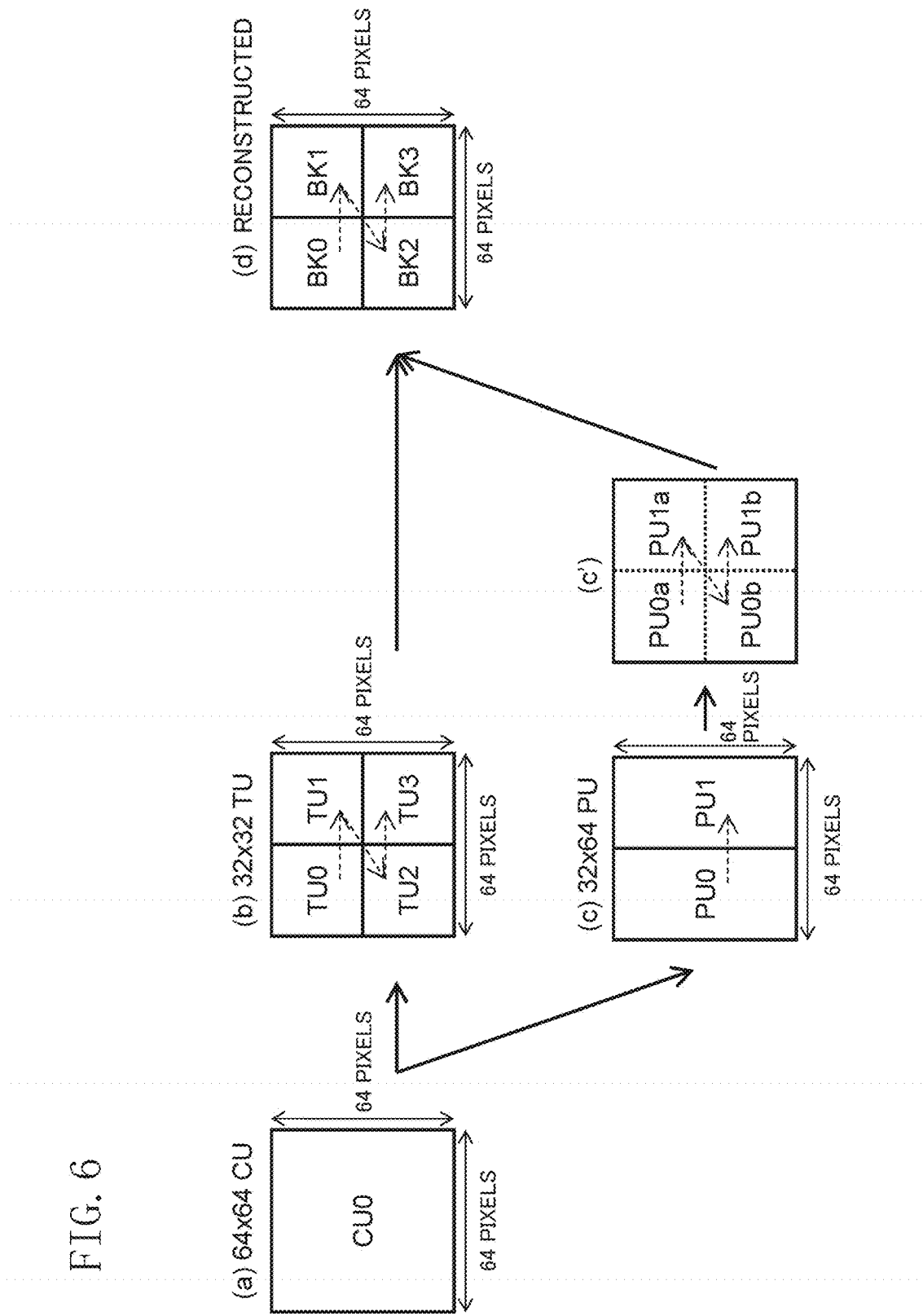
FIG. 6 illustrates exemplary block arrangements for a CU, PUs, TUs, and a reconstructed image in a situation where a conventional PU division is carried out instead of the PU division of the first embodiment.

FIG. 6 illustrates exemplary block arrangements for a CU, PUs, TUs, and a reconstructed image in a situation where a conventional PU division is carried out along the edges of TUs.

Portions (a), (b), (c), and (d) of FIG. 6 are respectively the same as portions (a), (b), (c), and (d) of FIG. 4, and the description thereof will be omitted herein.

Portion (c') of FIG. 6 illustrates an exemplary block arrangement for the prediction units of the coding unit CU0 shown in portion (a) of FIG. 6 which have been divided along the edges of TUs. In portion (c') of FIG. 6, the dotted lines indicate the arrangement of blocks to be processing units (the same notation will apply to each arrangement of divided blocks in the following description). In portion (c') of FIG. 6, shown are four blocks PU0a, PU0b, PU0a, and PU1b, which are supposed to be processed in the order of PU0a, PU1a, PU0b, and PU1b. Examples of processing to be performed on these four blocks PU0a, PU0b, PU1a, and PU1b include retrieval of a reference image, motion compensation processing, and predicted image output processing. Note that this processing is similar to the PU processing, and will be hereinafter referred to as "PU processing on divided blocks" (or simply "PU processing") unless otherwise stated.

Figure 7:
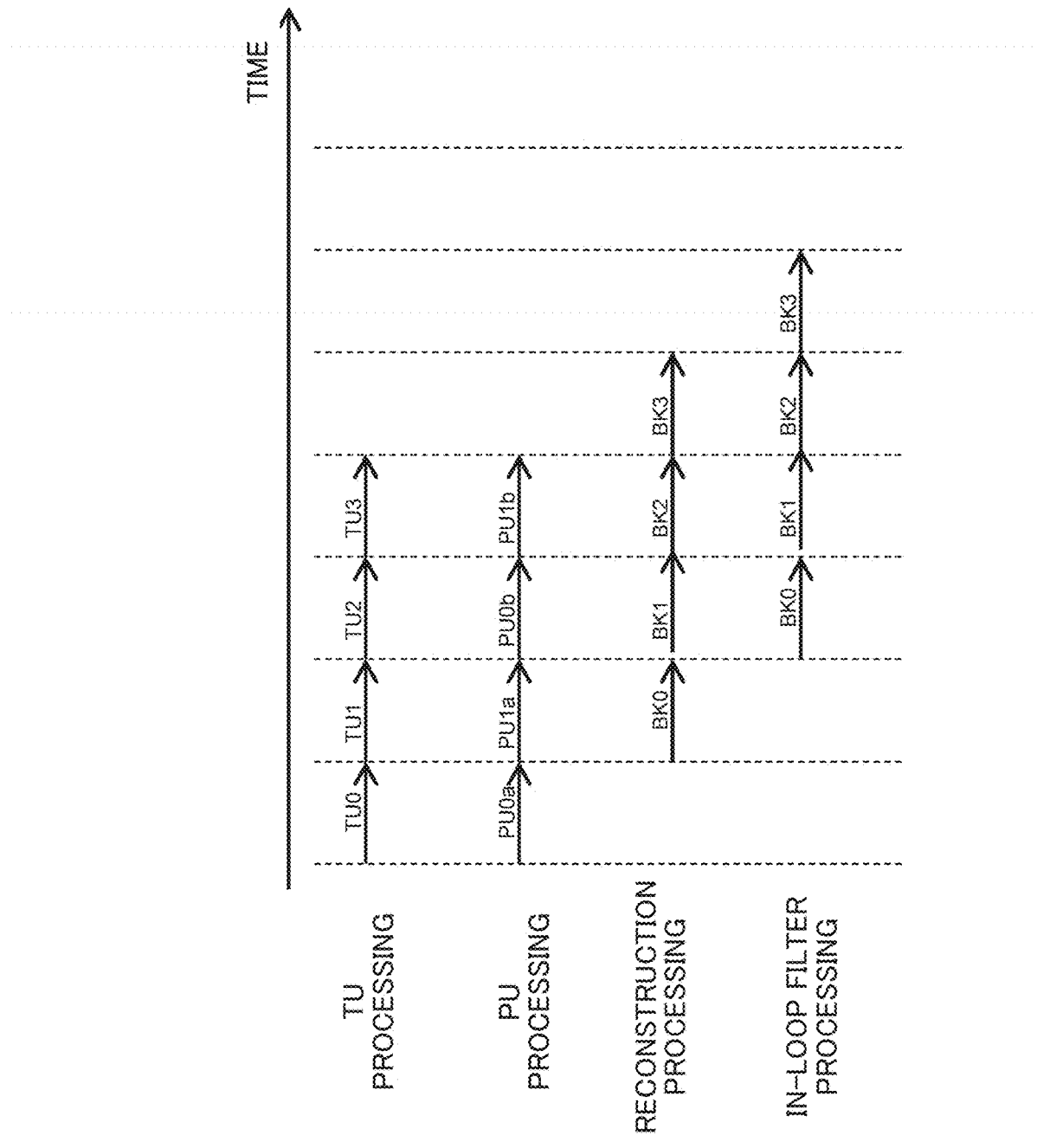
FIG. 7 is a timing chart showing how to perform pipeline processing in a situation where the conventional PU division is carried out instead of the PU division of the first embodiment.

FIG. 7 is a timing chart showing how to perform pipeline processing in a situation where the conventional PU division is carried out along the edges of TUs on the CU, TUs, PUs, and reconstructed image shown in FIG. 6.

In the example shown in FIG. 7, TU processing is carried out on transform units TU0, TU1, TU2, and TU3 in this order. In the meantime, PU processing is carried out in parallel on the blocks PU0a, PU0b, PU1a, and PU0b in the order of PU0a, PU1a, PU0b, and PU1b. After that, reconstruction processing is carried out on BK0, BK1, BK2, and BK3. Then in-loop filter processing is carried out on BK0-BK3. In this case, the reconstruction processing on the block BK0 is not started until the TU processing on TU0 is finished and until the PU processing on the block PU0a is finished. In the same way, the reconstruction processing on the blocks BK1, BK2, and BK3 is started sequentially at respective timings when the TU processing on TU1, TU2, and TU3 is finished in this order and when the PU processing on the blocks PU1a, PU0b, and PU1b is finished in this order.

In addition, the in-loop filter processing is also carried out on the blocks BK0, BK1, BK2, and BK3 in this order. In this case, it is not until the reconstruction processing on the block BK0 is finished that the in-loop filter processing on the block BK0 is started. In the same way, the in-loop filter processing on the blocks BK1, BK2, and BK3 is started sequentially at respective timings when the reconstruction processing on the blocks BK1, BK2, and BK3 is finished in this order.

In the example shown in FIG. 7, the predicted images each consisting of the divided blocks are output in the same order as the transform units. That is why both types of images needed for the reconstruction processing, namely, differential images and predicted images in the same area as the differential images, are all prepared earlier than in the example shown in FIG. 5. Thus, the reconstruction processing and the in-loop filter processing may be started with a decreased time lag. Consequently, the decoding processing may be speeded up.

However, the divided blocks PU0a, PU1a, PU0b, and PU1b each consist of 32×32 pixels, and as for each of these divided blocks PU0a, PU1a, PUb, and PU1b, the frame memory transfer controller 162 retrieves a reference image consisting of as many as 39×39 pixels (i.e., 1521 pixels) from the frame memory 180. Thus, the external memory bus is occupied.

Figure 8:
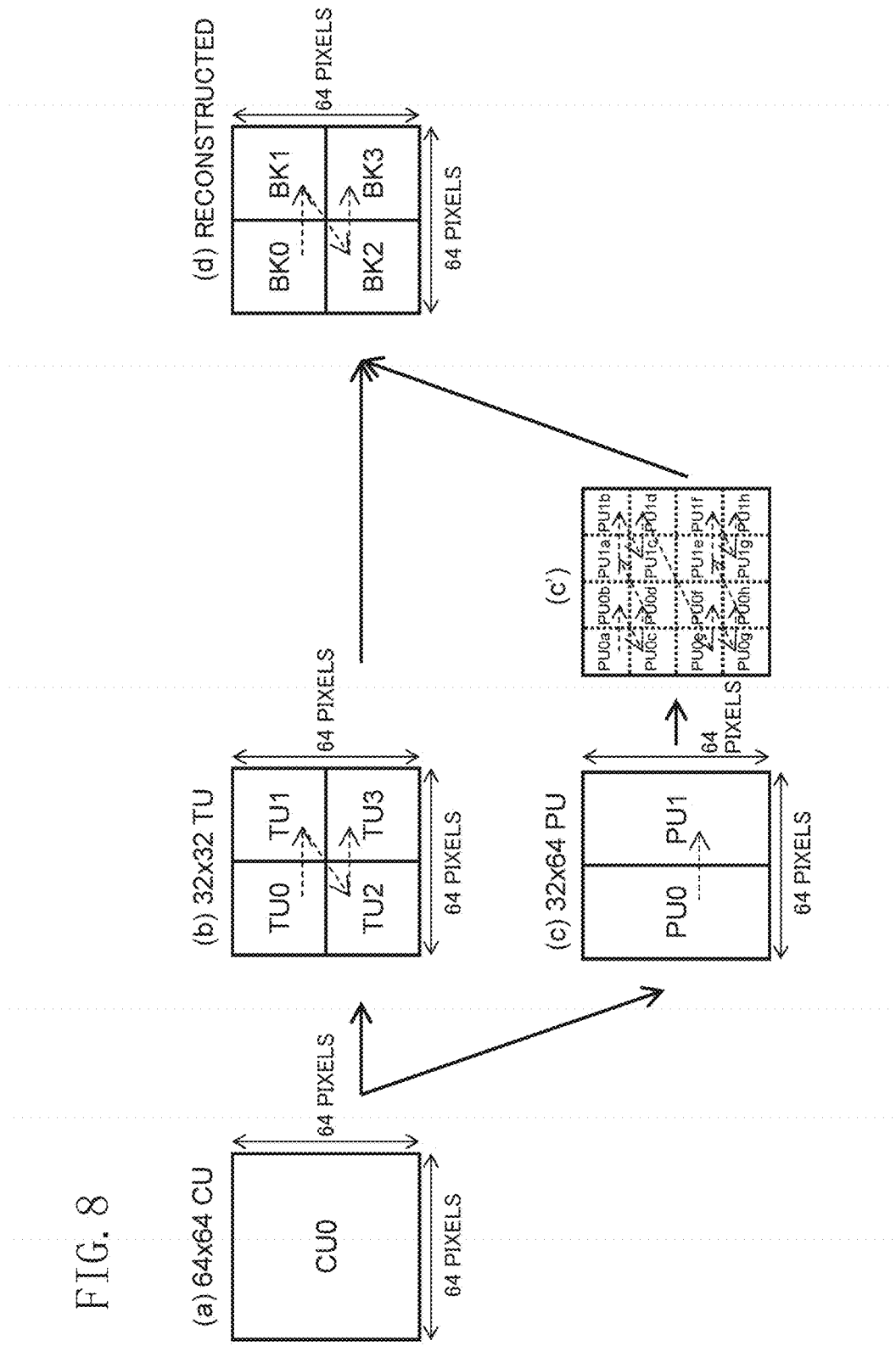
FIG. 8 illustrates exemplary block arrangements for a CU, PUs, TUs, and a reconstructed image in a situation where a PU division according to the first embodiment is carried out.

FIG. 8 illustrates exemplary block arrangements for a CU, PUs, TUs, and a reconstructed image in a situation where a PU division is carried out following the procedure shown in FIG. 3.

Portions (a), (b), (c), and (d) of FIG. 8 are respectively the same as portions (a), (b), (c), and (d) of FIG. 4, and the description thereof will be omitted herein.

Portion (c') of FIG. 8 illustrates an exemplary arrangement of divided blocks that have been obtained by dividing the prediction units of the coding unit CU0 shown in portion (a) of FIG. 8 at a preset threshold value (of, e.g., 16×16 pixels in this example). In portion (c') of FIG. 8, shown are sixteen blocks PU*a*, PU*b*, PU*c*, PU*d*, PU*e*, PU*f*, PU*g*, and PU*h*, and PU1*a*, PU1*b*, PU1*c*, PU1*d*, PU1*e*, PU1*f*, PU1*g*, and PU1*h*, and these sixteen blocks are processed in the order of PU0*a*, PU0*b*, PU0*c*, PU0*d*, PU1*a*, PU1*b*, PU1*c*, PU1*d*, PU0*e*, PU0*f*, PU0*g*, PU0*h*, PU1*e*, PU1*f*, PU1*g*, and PU1*h*. That is to say, these blocks are processed in a Z order such that each of the four blocks obtained by quadtree-dividing CU0 is recursively quadtree-divided into four blocks.

Figure 9:
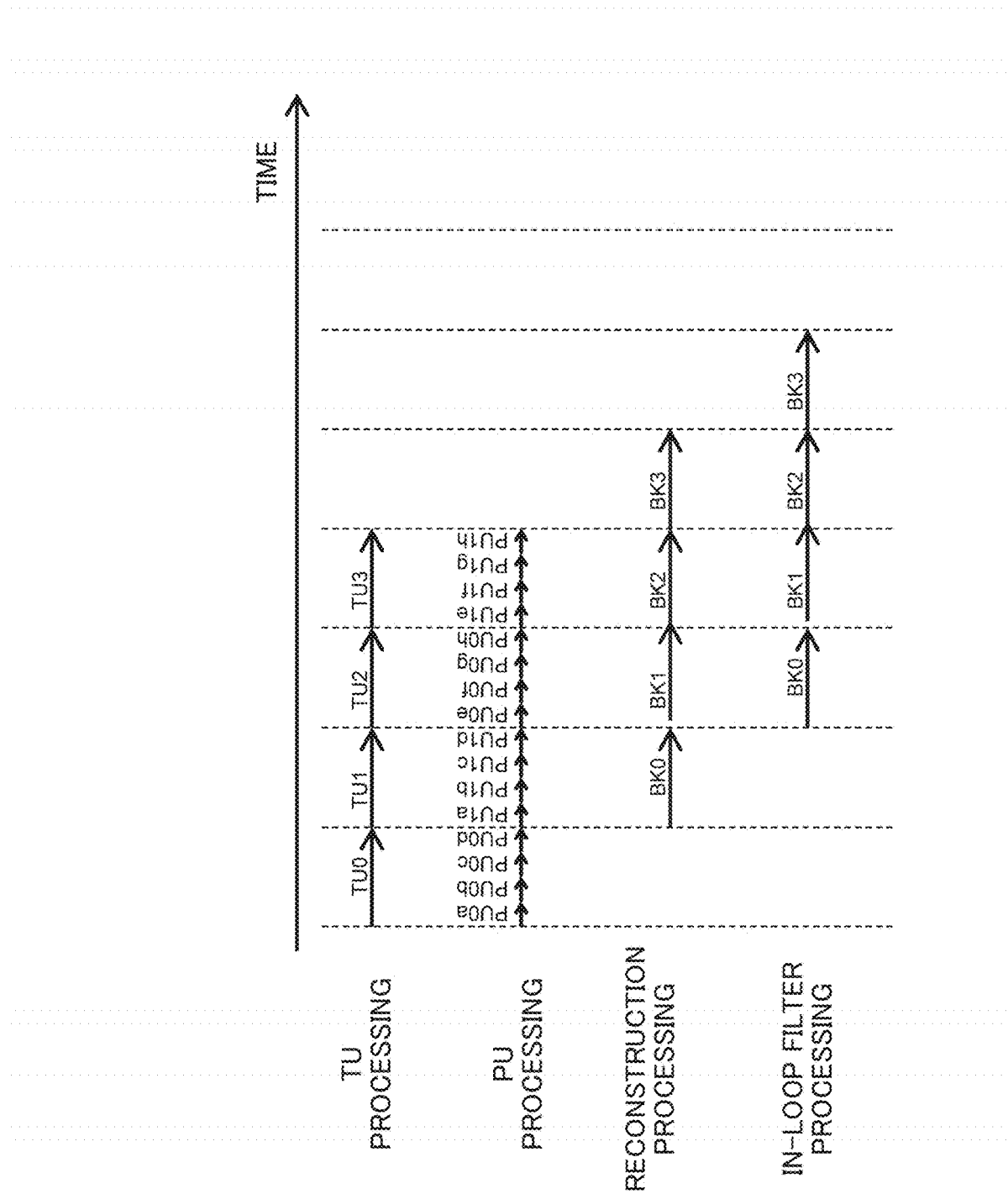
FIG. 9 is a timing chart showing how to perform pipeline processing in a situation where the PU division according to the first embodiment is carried out.

FIG. 9 is a timing chart showing how to perform pipeline processing in a situation where a PU division is carried out on the CU, TUs, PUs, and reconstructed image shown in FIG. 8 following the procedure shown in FIG. 3.

In the example shown in FIG. 9, TU processing is carried out on transform units TU0, TU1, TU2, and TU3 in this order. In the meantime, PU processing is carried out in parallel on the blocks PU0*a*-PU0*h* and PU1*a*-PU1*h* in the order of PU0*a*, PU0*b*, PU0*c*, PU*d*, PU1*a*, PU 1*b*, PU1*c*, PU1*d*, PU0*e*, PU0*f*, PU0*g*, PU0*h*,PU1*e*, PU1*f*, PU1*g*, and PU1*h*. After that, reconstruction processing is carried out on BK0, BK1, BK2, and BK3. Then in-loop filter processing is carried out on BK0-BK3. In this case, the reconstruction processing on the block BK0 is not started until the TU processing on TU0 is finished and until the PU processing on the blocks PU0*a*-PU0*d* is finished. In the same way, the reconstruction processing on the blocks BK1, BK2, and BK3 is started sequentially at respective timings when the TU processing on TU1, TU2, and TU3 is finished in this order and when the PU processing on the three sets of four blocks PU1*a*-PU1*d*, PU0*e*-PU0*h*, PU1*e*-PU1*h* is finished in this order.

In addition, the in-loop filter processing is also carried out on the blocks BK0, BK1, BK2, and BK3 in this order. In this case, it is not until the reconstruction processing on the block BK0 is finished that the in-loop filter processing on the block BK0 is started. In the same way, the in-loop filter processing on the blocks BK1, BK2, and BK3 is started sequentially at respective timings when the reconstruction processing on the blocks BK1, BK2, and BK3 is finished in this order.

In the example shown in FIG. 9, the predicted images each consisting of the divided blocks are output in the same order as the transform units. That is why both types of images needed for the reconstruction processing, namely, differential images and predicted images in the same area as the differential images, are all prepared earlier than in the example shown in FIG. 5. Thus, the reconstruction processing and the in-loop filter processing may be started with a decreased time lag. Consequently, the decoding processing may be speeded up.

Furthermore, the divided blocks PU0*a*-PU0*h* and PU1*a*-PU1*h* each consist of 16×16 pixels, and as for each of these divided blocks PU0*a*-PU0*h* and PU1*a*-PU1*h*, the frame memory transfer controller 162 retrieves a reference image consisting of 23×23 pixels (i.e., 529 pixels) from the frame memory 180. Since this image to be transferred is as large as a conventional macroblock, the external memory bus is not occupied. In addition, the decoding processing may be carried out at approximately as large a memory bandwidth as the conventional one.

Figure 10:
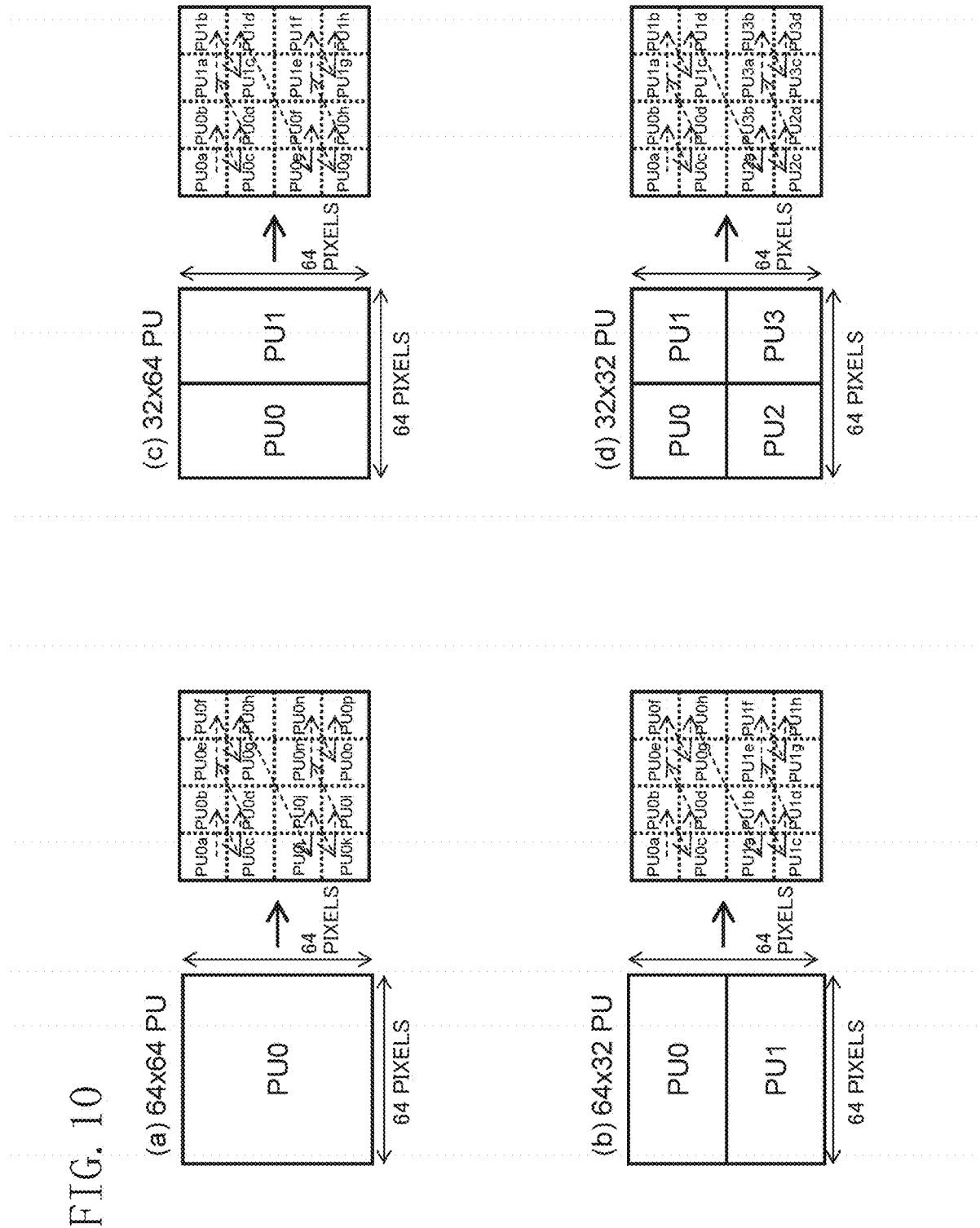
FIG. 10 illustrates exemplary block arrangements for PUs in a situation where a PU division according to the first embodiment is carried out on 64×64 CUs.

FIG. 10 illustrates exemplary block arrangements for PUs in a situation where a PU division is carried out on a 64×64 CU following the procedure shown in FIG. 3. In the following description, the threshold size at which the PU division is carried out is supposed to be 16×16 pixels in this case, for example.

Portion (a) of FIG. 10 illustrates an exemplary arrangement of divided blocks obtained by dividing a 64×64 PU at a threshold size of 16×16 pixels with respect to a 64×64 CU. In portion (a) of FIG. 10, the dotted lines indicate not only the arrangement of blocks but also blocks as processing units as well. In portion (a) of FIG. 10, shown as respective processing units are sixteen blocks PU0*a*-PU0*p*, which are processed in this order. That is to say, these sixteen blocks are processed in the order in which each of the four blocks obtained by quadtree-dividing the 64×64 CU has been recursively quadtree-divided (e.g., in a Z order).

Portion (b) of FIG. 10 illustrates an exemplary arrangement of divided blocks obtained by dividing each 64×32 PU at a threshold size of 16×16 pixels with respect to a 64×64 CU. In portion (b) of FIG. 10, the dotted lines indicate not only the arrangement of blocks but also blocks as processing units as well. In portion (b) of FIG. 10, shown as respective processing units are sixteen blocks PU0*a*-PU0*h* and PU1*a*-PU1*h*, which are processed in the order of PU*a*, PU0*b*, PU0*c*, PU0*d*, PU0*e*, PU0*f*, PU*g*, PU*h*, PU1*a*, PU1*b*, PU1*c*, PU1*d*, PU1*e*, PU1*f*, PU1*g*, and PU1*h*. That is to say, these sixteen blocks are processed in the order in which each of the four blocks obtained by quadtree-dividing the 64×64 CU has been recursively quadtree-divided (e.g., in a Z order).

Portion (c) of FIG. 10 illustrates an exemplary arrangement of divided blocks obtained by dividing each 32×64 PU at a threshold size of 16×16 pixels with respect to a 64×64 CU. In portion (c) of FIG. 10, the dotted lines indicate not only the arrangement of blocks but also blocks as processing units as well. In portion (c) of FIG. 10, shown as respective processing units are sixteen blocks PU0a-PU0h and PU1a-PU1h, which are processed in the order of PU0a, PU0b, PU0c, PU0d, PU1a, PU1b, PU1c, PU1d, PU0e, PU0f, PU0g, PU0h, PU1e, PU1f, PU1g, and PU1h. That is to say, these sixteen blocks are processed in the order in which each of the four blocks obtained by quadtree-dividing the 64×64 CU has been recursively quadtree-divided (e.g., in a Z order).

Portion (d) of FIG. 10 illustrates an exemplary arrangement of divided blocks obtained by dividing each 32×32 PU at a threshold size of 16×16 pixels with respect to a 64×64 CU. In portion (d) of FIG. 10, the dotted lines indicate not only the arrangement of blocks but also blocks as processing units as well. In portion (d) of FIG. 10, shown as respective processing units are sixteen blocks PU0a -PU0d, PU1a-PU1d, PU2a-PU2d, and PU3a-PU3d, which are processed in the order of PU0a, PU0b, PU0c, PU0d, PU1a, PU1b, PU1c, PU1d, PU2a, PU2b, PU2c, PU2d, PU3a, PU3b, PU3c, and PU3d. That is to say, these sixteen blocks are processed in the order in which each of the four blocks obtained by quadtree-dividing the 64×64 CU has been recursively quadtree-divided (e.g., in a Z order).

Figure 11:
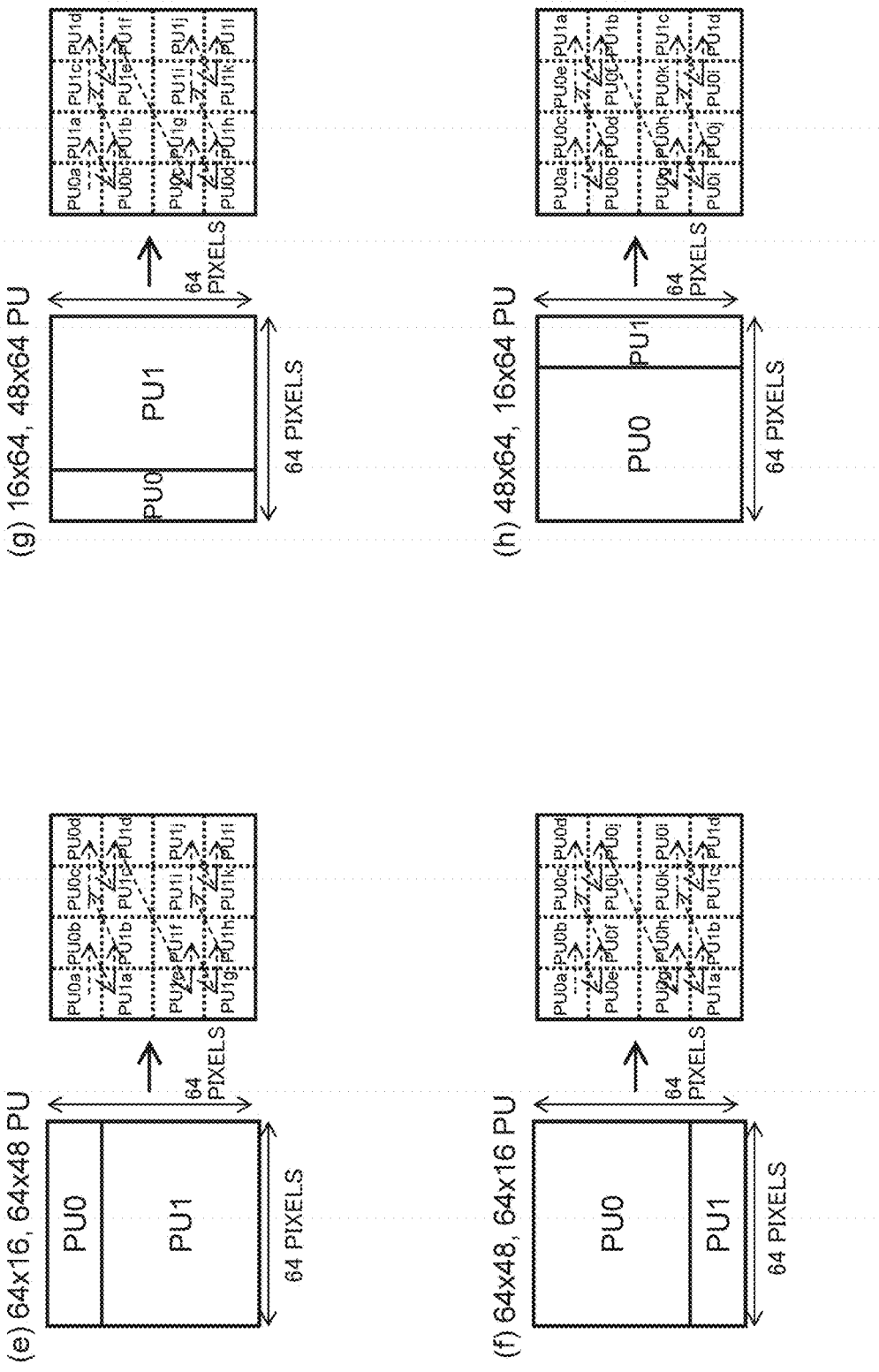
FIG. 11 illustrates exemplary block arrangements for PUs in a situation where a PU division according to the first embodiment is carried out on 64×64 CUs.

FIG. 11 illustrates exemplary block arrangements for PUs in a situation where a PU division is carried out on a 64×64 CU following the procedure shown in FIG. 3. In particular, the PUs are configured in this example as asymmetric blocks (hereinafter referred to as "asymmetric motion partitions (AMPs)").

In the following description, the threshold size at which the PU division is carried out is supposed to be 16×16 pixels in this case, for example.

Portion (e) of FIG. 11 illustrates an exemplary arrangement of divided blocks obtained by dividing each of a 64×16 PU and a 64×48 PU at a threshold size of 16×16 pixels with respect to a 64×64 CU. In portion (e) of FIG. 11, the dotted lines indicate not only the arrangement of blocks but also blocks as processing units as well. In portion (e) of FIG. 11, shown as respective processing units are sixteen blocks PU0a-PU0d and PU1a-PU1l, which are processed in the order of PU0a, PU0b, PU1a, PU1b, PU0c, PU0d, PU1c, PU1d, PU1e, PU1f, PU1g, PU1h, PU1i, PU1j, PU1k, and PU1l. That is to say, these sixteen blocks are processed in the order in which each of the four blocks obtained by quadtree-dividing the 64×64 CU has been recursively quadtree-divided (e.g., in a Z order).

Portion (f) of FIG. 11 illustrates an exemplary arrangement of divided blocks obtained by dividing each of a 64×48 PU and a 64×16 PU at a threshold size of 16×16 pixels with respect to a 64×64 CU. In portion (f) of FIG. 11, the dotted lines indicate not only the arrangement of blocks but also blocks as processing units as well. In portion (f) of FIG. 11, shown as respective processing units are sixteen blocks PU0a-PU0l and PU1a-PU1d, which are processed in the order of PU0a, PU0b, PU0c, PU0d, PU0e, PU0f, PU0g, PU0h, PU0i, PU0j, PU1a, PU1b, PU0k, PU0l, PU1c, and PU1d. That is to say, these sixteen blocks are processed in the order in which each of the four blocks obtained by quadtree-dividing the 64×64 CU has been recursively quadtree-divided (e.g., in a Z order).

Portion (g) of FIG. 11 illustrates an exemplary arrangement of divided blocks obtained by dividing each of a 16×64 PU and a 48×64 PU at a threshold size of 16×16 pixels with respect to a 64×64 CU. In portion (g) of FIG. 11, the dotted lines indicate not only the arrangement of blocks but also blocks as processing units as well. In portion (g) of FIG. 11, shown as respective processing units are sixteen blocks PU0a-PU0d and PU1a-PU1l, which are processed in the order of PU0a, PU1a, PU0b, PU1b, PU1c, PU1d, PU1e, PU1f, PU0c, PU1g, PU0d, PU1h, PU1i, PU1j, PU1k, and PU1l. That is to say, these sixteen blocks are processed in the order in which each of the four blocks obtained by quadtree-dividing the 64×64 CU has been recursively quadtree-divided (e.g., in a Z order).

Portion (h) of FIG. 11 illustrates an exemplary arrangement of divided blocks obtained by dividing each of a 48×64 PU and a 16×64 PU at a threshold size of 16×16 pixels with respect to a 64×64 CU. In portion (h) of FIG. 11, the dotted lines indicate not only the arrangement of blocks but also blocks as processing units as well. In portion (h) of FIG. 11, shown as respective processing units are sixteen blocks PU0a-PU0l and PU1a-PU1d, which are processed in the order of PU0a, PU0b, PU0c, PU0d, PU0e, PU1a, PU0f, PU1b, PU0g, PU0h, PU0i, PU0j, PU0k, PU1c, PU0l, and PU1d. That is to say, these sixteen blocks are processed in the order in which each of the four blocks obtained by quadtree-dividing the 64×64 CU has been recursively quadtree-divided (e.g., in a Z order).

That is to say, with respect to the 64×64 CU, each and every one of the PUs is divided into the same set of 16×16 blocks, which are always processed in the same order as shown in portions (a)-(d) of FIG. 10 and (e)-(h) of FIG. 11.

Figure 12:
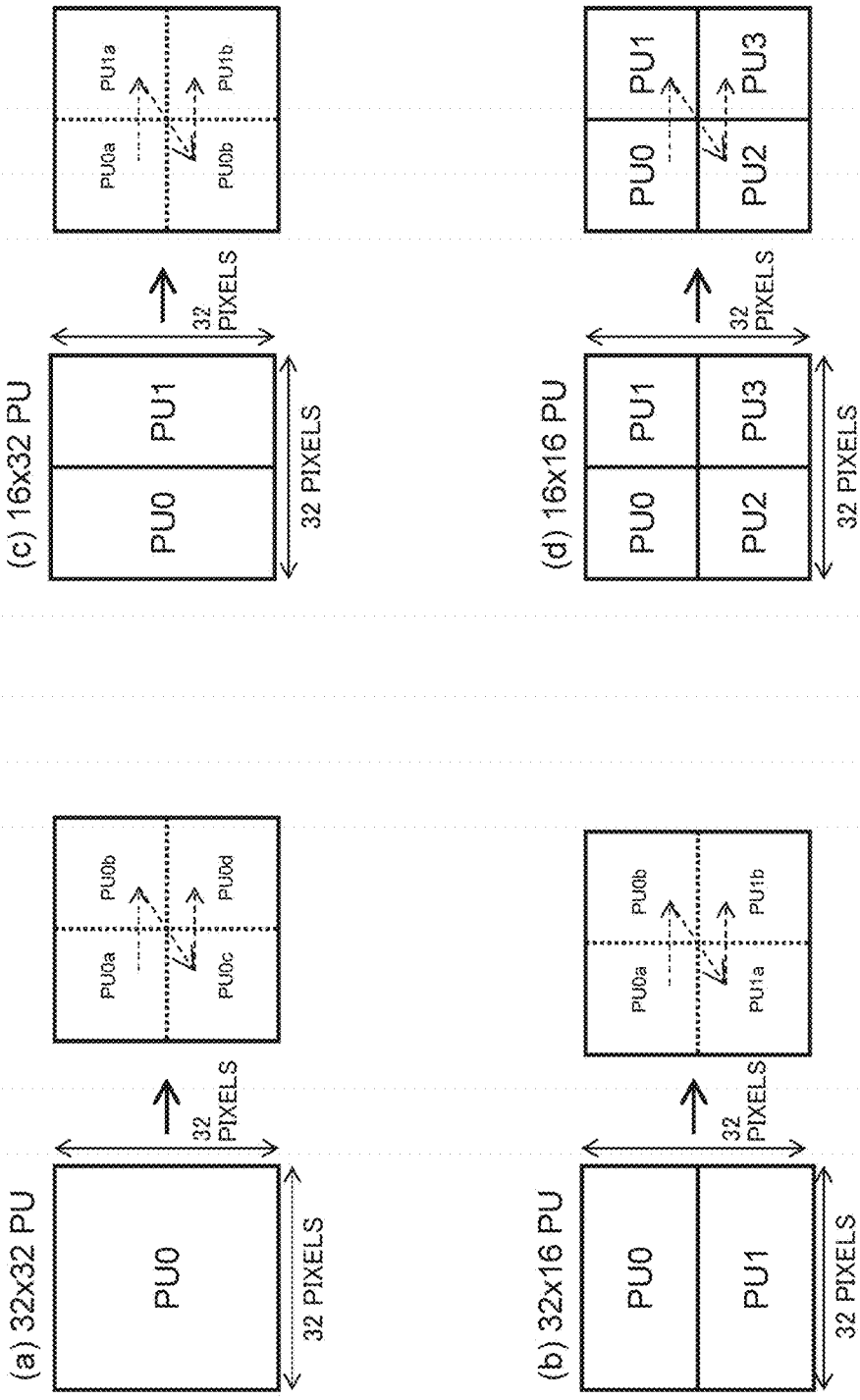
FIG. 12 illustrates exemplary block arrangements for PUs in a situation where a PU division according to the first embodiment is carried out on 32×32 CUs.

FIG. 12 illustrates exemplary block arrangements for PUs in a situation where a PU division is carried out on a 32×32 CU following the procedure shown in FIG. 3.

Portion (a) of FIG. 12 illustrates an exemplary arrangement of divided blocks obtained by dividing a 32×32 PU at a threshold size of 16×16 pixels with respect to a 32×32 CU. In portion (a) of FIG. 12, the dotted lines indicate not only the arrangement of blocks but also blocks as processing units as well. In portion (a) of FIG. 12, shown as respective processing units are four blocks PU0a, PU0b, PU0c, and PU0d, which are processed in this order. That is to say, these four blocks obtained by quadtree-dividing the 32×32 CU are processed in the order of the quadtree division (e.g., in a Z order).

Portion (b) of FIG. 12 illustrates an exemplary arrangement of divided blocks obtained by dividing each 32×16 PU at a threshold size of 16×16 pixels with respect to a 32×32 CU. In portion (b) of FIG. 12, the dotted lines indicate not only the arrangement of blocks but also blocks as processing units as well. In portion (b) of FIG. 12, shown as respective processing units are four blocks PU0a, PU0b, PU1a, and PU1b, which are processed in this order. That is to say, these four blocks obtained by quadtree-dividing the 32×32 CU are processed in the order of the quadtree division (e.g., in a Z order).

Portion (c) of FIG. 12 illustrates an exemplary arrangement of divided blocks obtained by dividing each 16×32 PU at a threshold size of 16×16 pixels with respect to a 32×32 CU. In portion (c) of FIG. 12, the dotted lines indicate not only the arrangement of blocks but also blocks as processing units as well. In portion (c) of FIG. 12, shown as respective processing units are four blocks PU0a, PU0b, PU1a, and PU1b, which are processed in the order of PU0a, PU1a, PU0b, and PU1b. That is to say, these four blocks obtained by quadtree-dividing the 32×32 CU are processed in the order of the quadtree division (e.g., in a Z order).

Portion (d) of FIG. 12 illustrates an exemplary arrangement of blocks which have not been subjected to any PU division because the four 16×16 PUs are each as large as the threshold size of 16×16 pixels with respect to a 32×32 CU.

In portion (d) of FIG. 12, shown are four blocks PU0, PU1, PU2, and PU3, which are processed in this order. That is to say, these four blocks obtained by quadtree-dividing the 32×32 CU are processed in the order of the quadtree division (e.g., in a Z order).

Figure 13:
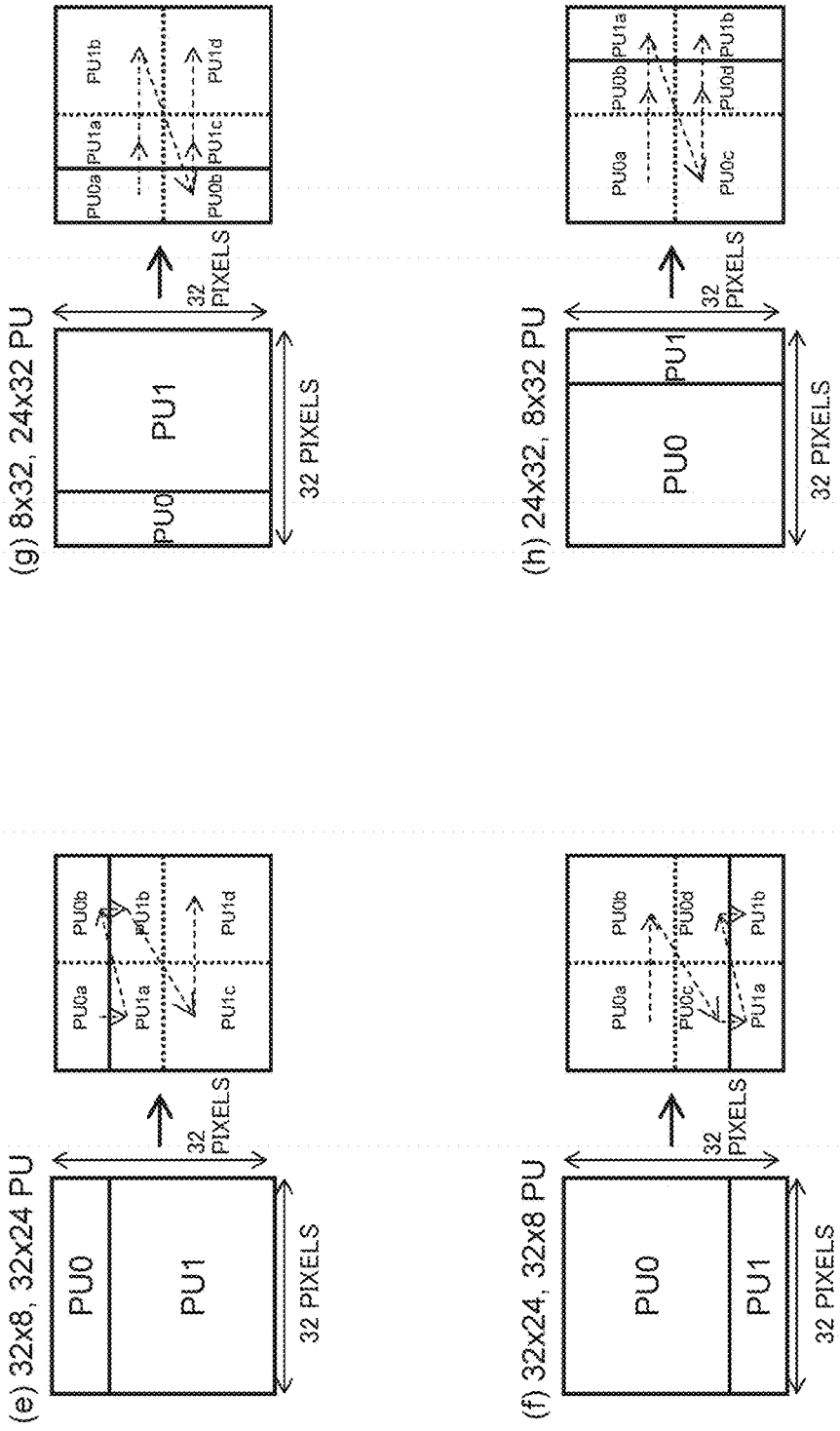
FIG. 13 illustrates exemplary block arrangements for PUs in a situation where a PU division according to the first embodiment is carried out on 32×32 CUs.

FIG. 13 illustrates exemplary block arrangements for PUs in a situation where a PU division is carried out on a 32×32 CU following the procedure shown in FIG. 3. In particular, the PUs are configured in this example as asymmetric blocks (AMPs).

Portion (e) of FIG. 13 illustrates an exemplary arrangement of divided blocks obtained by dividing each of a 32×8 PU and a 32×24 PU at a threshold size of 16×16 pixels with respect to a 32×32 CU. In portion (e) of FIG. 13, the dotted lines indicate the arrangement of blocks, and the solid and dotted lines indicate the six blocks PU0a, PU0b, PU1a, PU1b, PU1c, and PU1d as processing units, which are processed in the order of PU0a, PU1a, PU0b, PU1b, PU1c, and PU1d. That is to say, these six blocks are processed in an order based on the four 16×16 blocks obtained by quadtree-dividing the 32×32 CU (e.g., in a Z order that is also applied to inside each 16×16 block).

Portion (f) of FIG. 13 illustrates an exemplary arrangement of divided blocks obtained by dividing each of a 32×24 PU and a 32×8 PU at a threshold size of 16×16 pixels with respect to a 32×32 CU. In portion (f) of FIG. 13, the dotted lines indicate the arrangement of blocks, and the solid and dotted lines indicate the six blocks PU0a, PU0b, PU0c, PU0d, PU1a, and PU1b as processing units, which are processed in the order of PU0a, PU0b, PU0c, PU1a, PU0d, and PU1b. That is to say, these six blocks are processed in an order based on the four 16×16 blocks obtained by quadtree-dividing the 32×32 CU (e.g., in a Z order that is also applied to inside each 16×16 block).

Portion (g) of FIG. 13 illustrates an exemplary arrangement of divided blocks obtained by dividing each of an 8×32 PU and a 24×32 PU at a threshold size of 16×16 pixels with respect to a 32×32 CU. In portion (g) of FIG. 13, the dotted lines indicate the arrangement of blocks, and the solid and dotted lines indicate the six blocks PU0a, PU0b, PU1a, PU1b, PU1c, and PU1d as processing units, which are processed in the order of PU0a, PU1a, PU1b, PU0b, PU1c, and PU1d. That is to say, these six blocks are processed in an order based on the four 16×16 blocks obtained by quadtree-dividing the 32×32 CU (e.g., in a Z order that is also applied to inside each 16×16 block).

Portion (h) of FIG. 13 illustrates an exemplary arrangement of divided blocks obtained by dividing each of a 24×32 PU and an 8×32 PU at a threshold size of 16×16 pixels with respect to a 32×32 CU. In portion (h) of FIG. 13, the dotted lines indicate the arrangement of blocks, and the solid and dotted lines indicate the six blocks PU0a, PU0b, PU0c, PU0d, PU1a, and PU1b as processing units, which are processed in the order of PU0a, PU0b, PU1a, PU0c, PU0d, and PU1b. That is to say, these six blocks are processed in an order based on the four 16×16 blocks obtained by quadtree-dividing the 32×32 CU (e.g., in a Z order that is also applied to inside each 16×16 block).

That is to say, as for a 32×32 CU, PUs are processed in an order based on the four 16×16 blocks obtained by quadtree-dividing the 32×32 CU (e.g., in a Z order), and if the division also needs to be made inside each 16×16 block, the divided blocks are also processed in the Z order as well, as shown in portions (a)-(d) of FIG. 12 and (e)-(h) of FIG. 13. Note that if the processing unit blocks to be processed in the Z order are upper and lower blocks, the processing in the Z order means processing the upper and lower blocks in this order. On the other hand, if the processing unit blocks to be processed in the Z order are left and right blocks, the processing in the Z order means processing the left and right blocks in this order. Thus, even if two processing unit blocks, each consisting of the same number of 16×16 pixels, are supposed to be present at the same location of two different PUs, those processing unit blocks are processed in mutually different orders. For example, look at the 16×16 block at the upper left corner in portions (e) and (g) of FIG. 13, and it can be seen that the blocks PU0a and PU1a are processed in the order of upper and lower divided blocks in portion (e) of FIG. 13 but in the order of left and right divided blocks in portion (g) of FIG. 13. Thus, even a block covering multiple prediction units may also be processed on the basis of a block obtained by quadtree-dividing the CU, irrespective of the shape of the prediction units. Eventually, an image decoding processing pipeline may be formed on the basis of a square block unit of 16×16 pixels, for example, irrespective of the shape of the prediction units.

Next, a situation where a PU is comprised of asymmetric blocks (AMPs) will be described.

Figure 14:
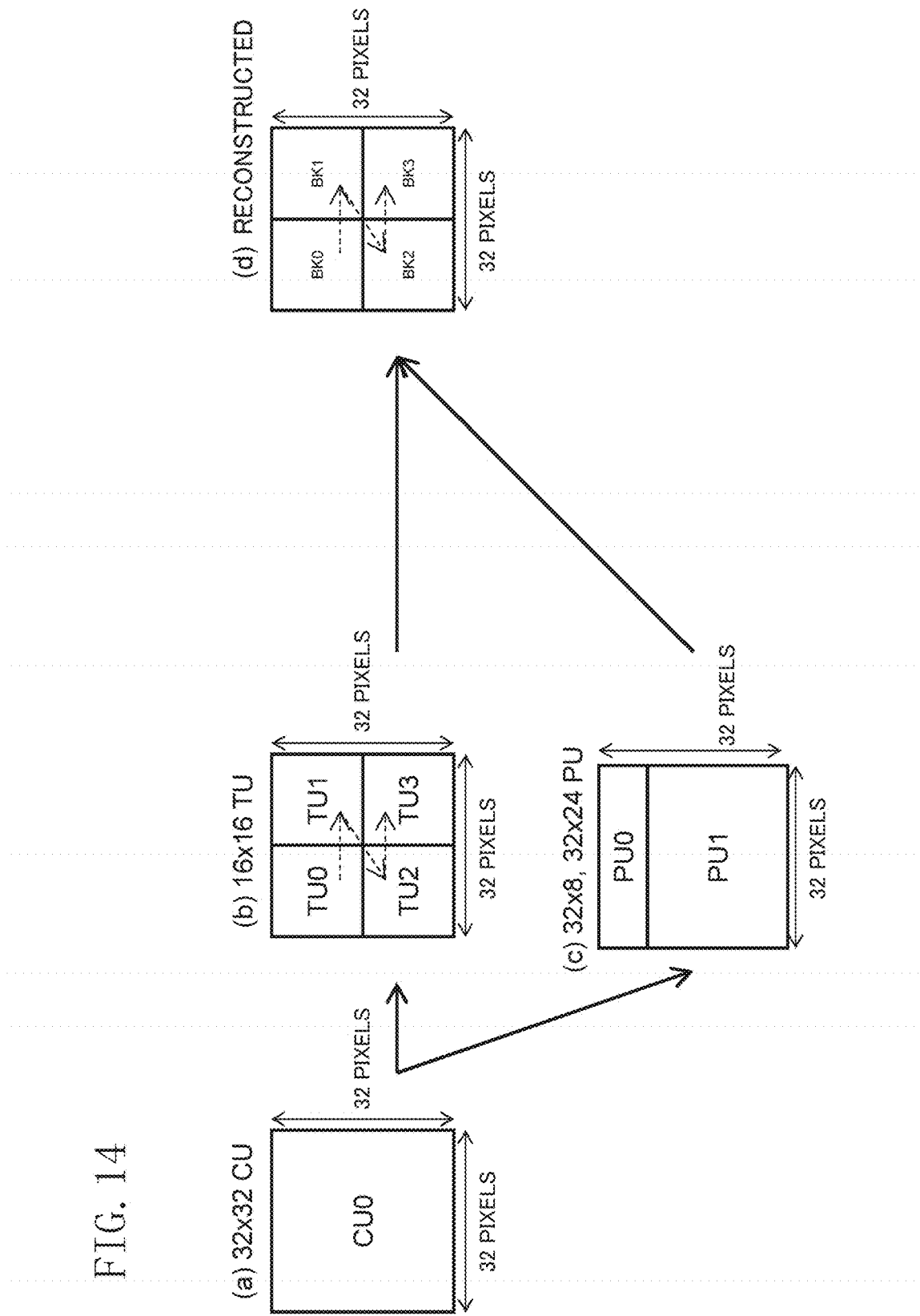
FIG. 14 illustrates exemplary block arrangements for a CU, PUs, TUs, and a reconstructed image in a situation where the PU division according to the first embodiment is not carried out.

FIG. 14 illustrates exemplary block arrangements for a CU, PUs, TUs, and a reconstructed image in a situation where the PU division according to the first embodiment is not carried out.

Portion (a) of FIG. 14 illustrates an exemplary arrangement for a CU according to this embodiment. CU0 shown in portion (a) of FIG. 14 has a size of 32×32 pixels.

Portion (b) of FIG. 14 illustrates an exemplary arrangement of TUs in CU0 shown in portion (a) of FIG. 14. In portion (b) of FIG. 14, four transform units, each consisting of 16×16 pixels, are identified by the reference signs TU0, TU1, TU2, and TU3, respectively, which are processed in this order. Examples of the processing to be performed on the four transform units TU0 to TU3 include inverse quantization and inverse frequency transform. In any case, the result is output as a residual image.

Portion (c) of FIG. 14 illustrates an exemplary arrangement of PUs in CU0 shown in portion (a) of FIG. 14. In portion (c) of FIG. 14, two prediction units, namely, a 32×8 PU and a 32×24 PU, are identified by the reference signs PU0 and PU1, respectively, which are also processed in this order.

Portion (d) of FIG. 14 illustrates an exemplary arrangement of blocks after CU0 shown in portion (a) of FIG. 14 has been divided. In portion (d) of FIG. 14, shown are four blocks BK0, BK1, BK2, BK3, which are also processed in this order. Examples of the processing to be performed on these four blocks BK0-BK3 include reconstruction processing, in-loop filter processing, and storage processing to the frame memory 180. Although the divided blocks shown in portion (d) of FIG. 14 are supposed to each have the same size as TUs, the divided blocks may also each have the same size as PUs or any other arbitrary size as well.

Figure 15:
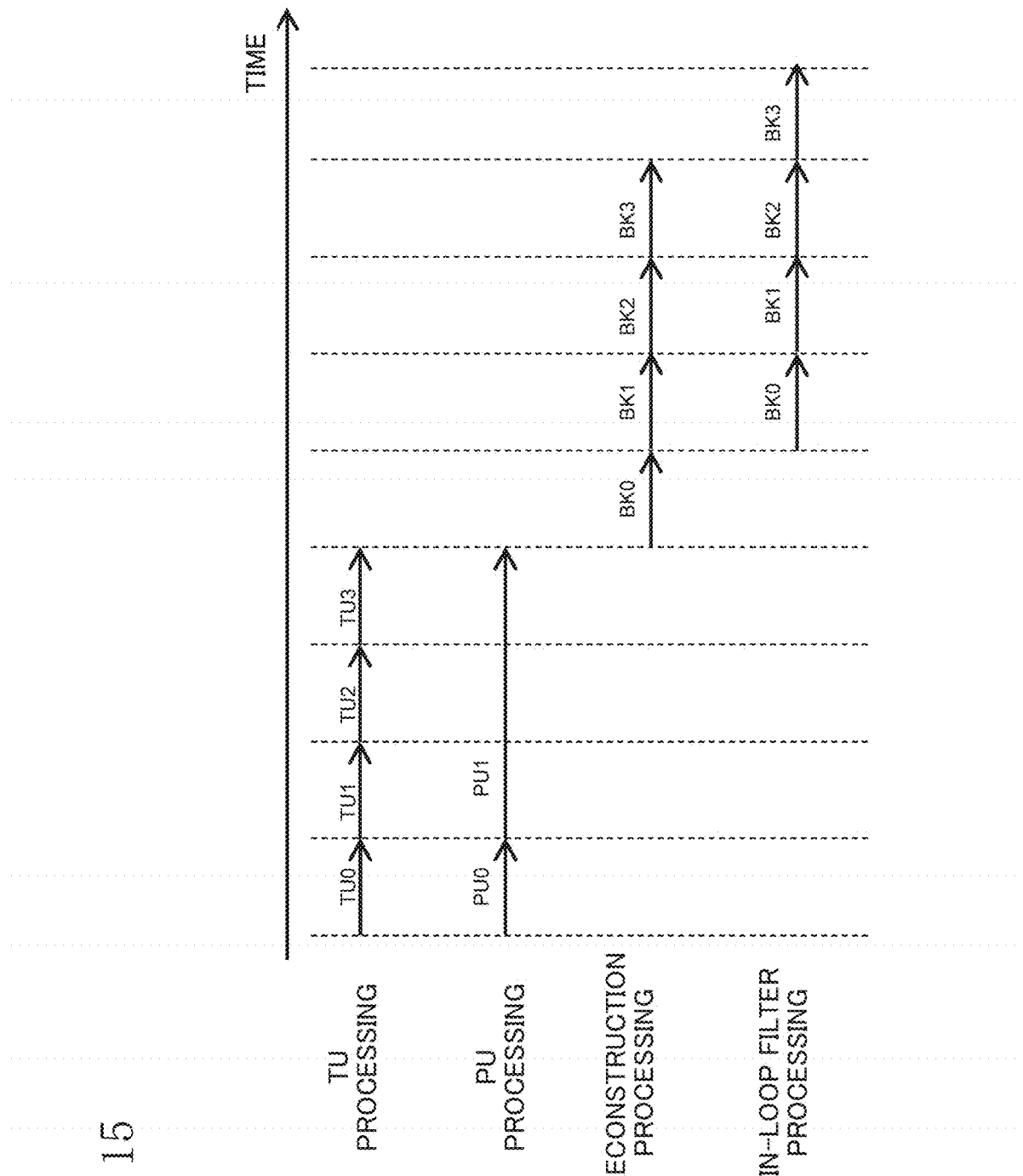
FIG. 15 is a timing chart showing how to perform pipeline processing in a situation where the PU division according to the first embodiment is not carried out.

FIG. 15 is a timing chart showing how to perform pipeline processing in a situation where the procedure shown in FIG. 3 is not applied to the CU, TUs, PUs, or reconstructed image shown in FIG. 14. In the example shown in FIG. 15, TU processing is carried out on transform units TU0, TU1, TU2, and TU3 in this order. Although not shown in FIG. 15 (and will not be shown in any of the timing charts to be referred to in the following description), decoding processing has already been carried out by the decoder 110 before the TU processing. In the meantime, PU processing is carried out in parallel on prediction units PU0 and PU1. After that, reconstruction processing is carried out on BK0, BK1, BK2, and BK3. Then in-loop filter processing is carried out on BK0-BK3.

In the example shown in FIG. 15, the reconstruction processing cannot be started until the TU processing on TU0 is finished and until the PU processing on PU0 and PU1 is finished. That is to say, there is a time lag between a point in time when the TU processing on TU0 was finished and a point in time when the reconstruction processing may be started.

Figure 16:
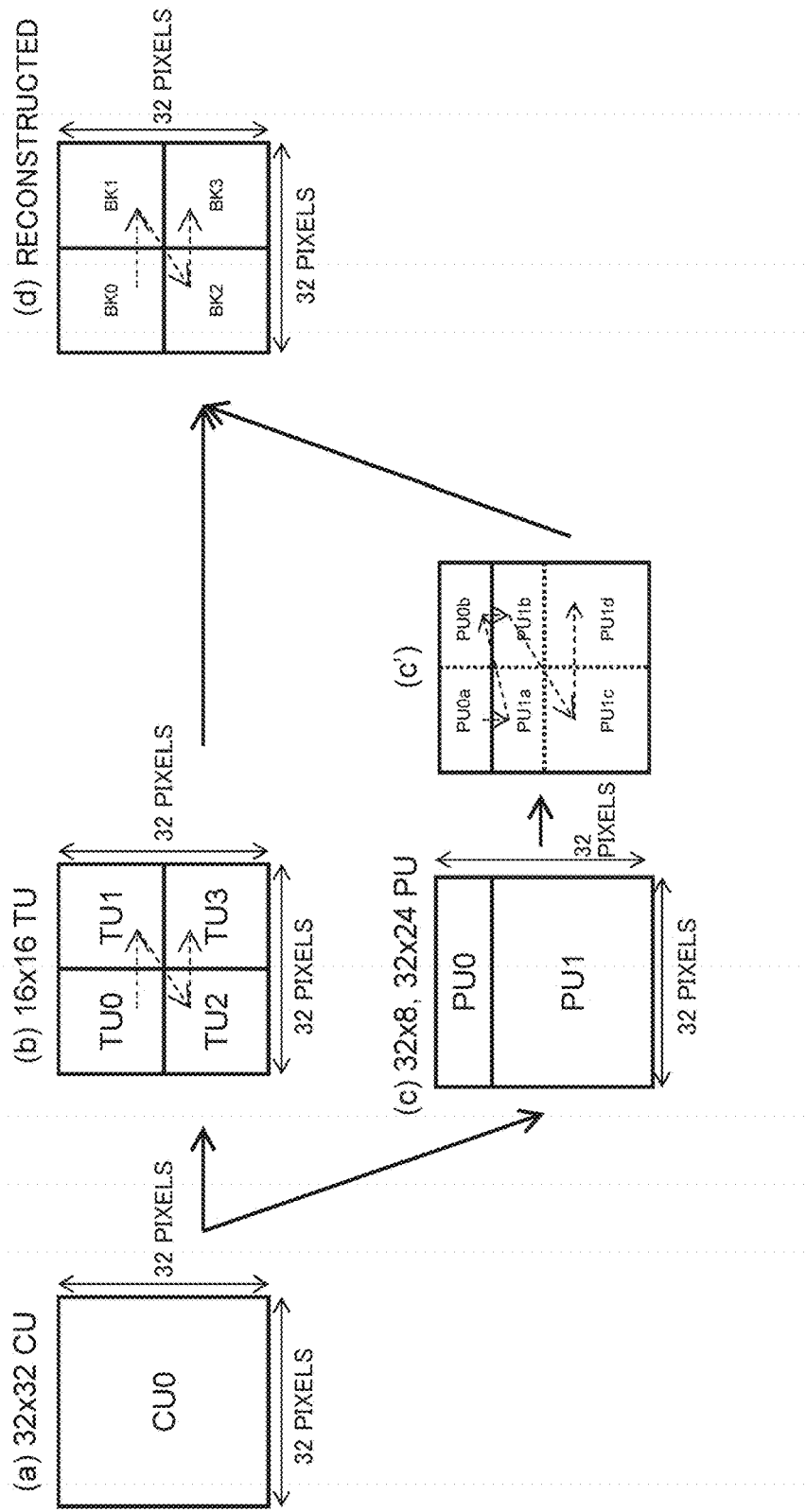
FIG. 16 illustrates exemplary block arrangements for a CU, PUs, TUs, and a reconstructed image in a situation where a PU division according to the first embodiment is carried out.

FIG. 16 illustrates exemplary block arrangements for a CU, PUs, TUs, and a reconstructed image in a situation where a PU division is carried out following the procedure shown in FIG. 3.

Portions (a), (b), (c), and (d) of FIG. 16 are respectively the same as portions (a), (b), (c), and (d) of FIG. 14, and the description thereof will be omitted herein.

Portion (c') of FIG. 16 illustrates an exemplary arrangement of divided blocks obtained by dividing each of the prediction units of the coding unit CU0 shown in portion (a) of FIG. 16 on the basis of a predetermined threshold value of e.g., 16×16 pixels in this case. In portion (c') of FIG. 16, the dotted lines indicate the arrangement of blocks, and the solid and dotted lines indicate the six blocks PU0a, PU0b, PU1a, PU1b, PU1c, and PU1d as processing units, which are processed in the order of PU0a, PU1a, PU0b, PU1b, PU1c, and PU1d. That is to say, these six blocks are processed in the order in which the four blocks obtained by quadtree-dividing CU0 have been subjected to the quadtree division (e.g., in a Z order).

Figure 17:
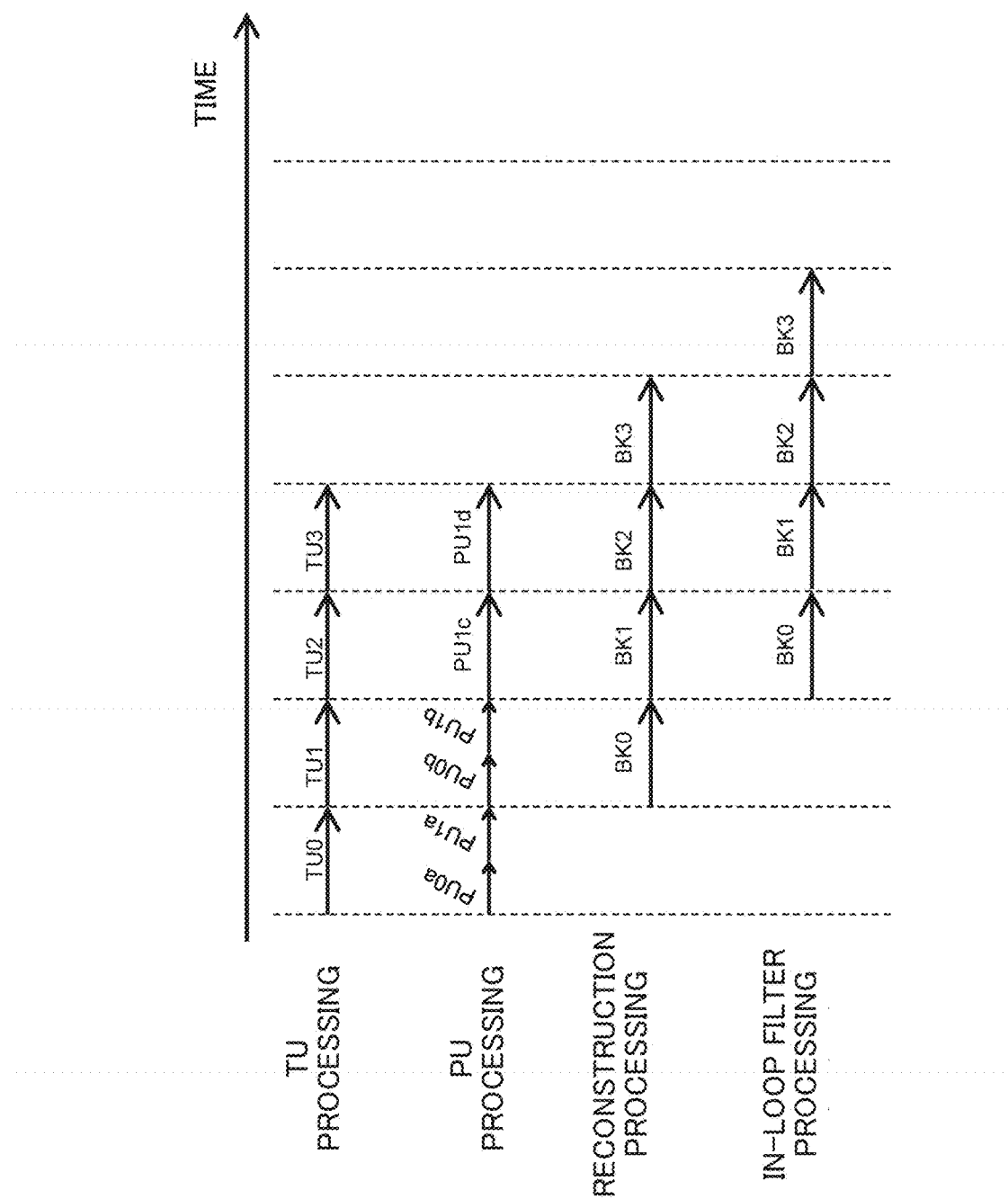
FIG. 17 is a timing chart showing how to perform pipeline processing in a situation where a PU division according to the first embodiment is carried out.

FIG. 17 is a timing chart showing how to perform pipeline processing in a situation where a PU division is carried out on the CU, TUs, PUs, and reconstructed image shown in FIG. 16 following the procedure shown in FIG. 3.

In the example shown in FIG. 17, TU processing is carried out on transform units TU0, TU1, TU2, and TU3 in this order. In the meantime, PU processing is carried out in parallel on the blocks PU0a, PU0b, PUa, PU1b, PU1c, and PU1d in the order of PU0a, PU1a, PU0b, PU1b, PU1c, and PU1d. After that, reconstruction processing is carried out on BK0, BK1, BK2, and BK3 in this order. Then in-loop filter processing is carried out on BK0-BK3 in this order. In this case, it is not until the TU processing on TU0 is finished and until the PU processing on the blocks PU0a and PU1a is finished that the reconstruction processing on the block BK0 is started. In the same way, the reconstruction processing on the blocks BK1, BK2, and BK3 is started sequentially at respective timings when the TU processing on the blocks TU1, TU2, and TU3 is finished in this order and when the PU processing on the two blocks PU0b and PU1b, the PU processing on the blocks PU1c, and the PU processing on the blocks PU1d are finished in this order.

In addition, the in-loop filter processing is carried out on the blocks BK0, BK1, BK2, and BK3 in this order. In this case, it is not until the reconstruction processing on the block BK0 is finished that the in-loop filter processing on the block BK0 is started. In the same way, the in-loop filter processing on the blocks BK1, BK2, and BK3 is started sequentially at respective timings when the reconstruction processing on the blocks BK1, BK2, and BK3 is finished in this order.

In the example shown in FIG. 17, the predicted images each consisting of the divided blocks are output in the same order as the transform units. That is why both of two types of images needed for the reconstruction processing, namely, differential images and predicted images in the same area as the differential images, are all prepared earlier than in the example shown in FIG. 15. Thus, the reconstruction processing and the in-loop filter processing may be started with a decreased time lag. Consequently, the decoding processing may be speeded up. In addition, since the reconstruction processing may be started earlier than in the example shown in FIG. 15, there is no need to retain the result of the TU processing on TU1-TU3 or the result of the PU processing on PU1, and therefore, the circuit areas that would otherwise be reserved for the local reference memory and the predicted image memory may be cut down as well.

As described above, if the PU division threshold size is set to be around 16×16 pixels, the reference image may be retrieved at as large a transfer size as a conventional macroblock (of 16×16 pixels), and therefore, the external memory bus is not occupied. In addition, the decoding processing may be carried out at approximately as large a memory bandwidth as the conventional one. Furthermore, the PU division allows the built-in local reference memory 163 and predicted image memory 165 to have a smaller storage capacity, which thus cuts down the cost. Besides, the motion compensation processor 164 does not have to include a circuit to process a prediction unit consisting of 64×64 pixels that is the maximum standard size of a PU, and therefore, may have a reduced area on the chip.

Note that if a CU, of which the size is approximately equal to or smaller than the threshold size for the PU division, is subjected to the prediction processing without dividing the PU (i.e., with the size of each PU unchanged), the decoding processing may be carried out without increasing the external memory bandwidth.

Furthermore, if the problem of bus occupancy ratio may be resolved by the performance enhancement of an external memory, the threshold size may be increased as well.

In the foregoing description, the prediction unit is supposed to be an inter-prediction unit. However, the same or similar PU division method is applicable to even a situation where the prediction unit is an intra-prediction unit.

Moreover, in the foregoing description, the transform unit is supposed to be a 32×32 TU in most cases. However, even if a CU is divided into transform units of an even smaller size (e.g., a situation where TU Layers 0, 1, and 2 are adopted), the same or similar PU division method is applicable irrespective of the size of TUs.

Second Embodiment

An image decoding device will now be described as a second embodiment of the present disclosure. An image decoding device according to the second embodiment adopts a different dividing method for the reconstruction processing from the one adopted in the first embodiment.

Figure 18:
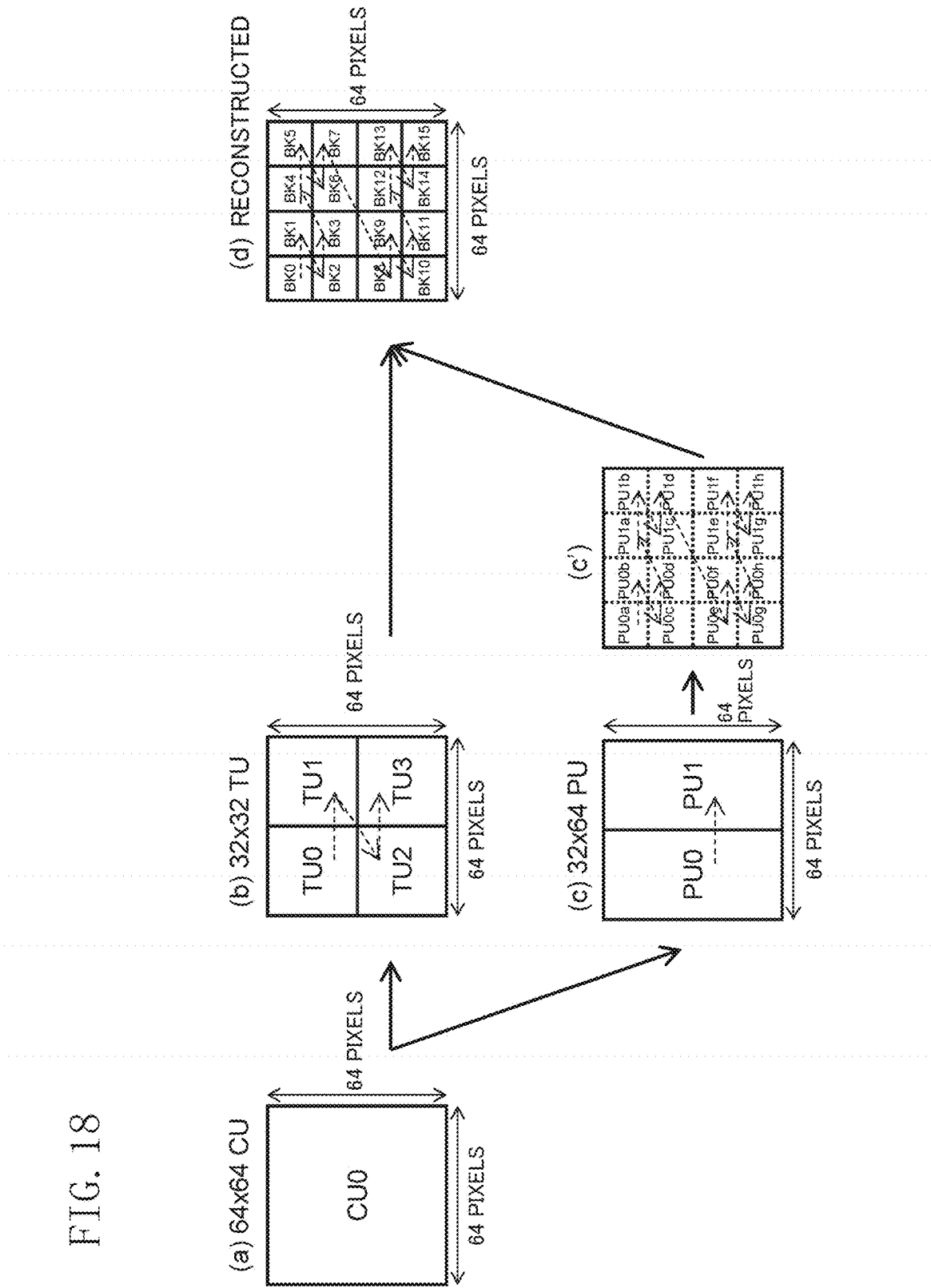
FIG. 18 illustrates exemplary block arrangements for a CU, PUs, TUs, and a reconstructed image in a situation where a PU division according to a second embodiment is carried out.

FIG. 18 illustrates exemplary block arrangements for a CU, PUs, TUs, and a reconstructed image in a situation where a PU division is carried out following the procedure shown in FIG. 3.

Portions (a), (b), (c), and (c') of FIG. 18 are respectively the same as portions (a), (b), (c), and (c') of FIG. 8, and the description thereof will be omitted herein.

Portion (d) of FIG. 18 illustrates an exemplary arrangement of blocks after CU0 shown in portion (a) of FIG. 18 has been divided. In portion (d) of FIG. 18, shown are sixteen blocks BK0, BK1, BK2, BK3, BK4, BK5, BK6, BK7, BK8, BK9, BK10, BK11, BK12, BK13, BK14, and BK15, which are processed in this order. Examples of the processing to be performed on these sixteen blocks BK0-BK15 include reconstruction processing, in-loop filter processing, and storage processing to the frame memory 180. Although the divided blocks shown in portion (d) of FIG. 18 are supposed to each have the same size as the PUs divided, the PUs may also be divided into blocks of an even smaller size as well.

That is to say, in the reconstruction processing, the blocks are processed in the order in which each of the four blocks obtained by quadtree-dividing CU0 has been recursively quadtree-divided.

Figure 19:
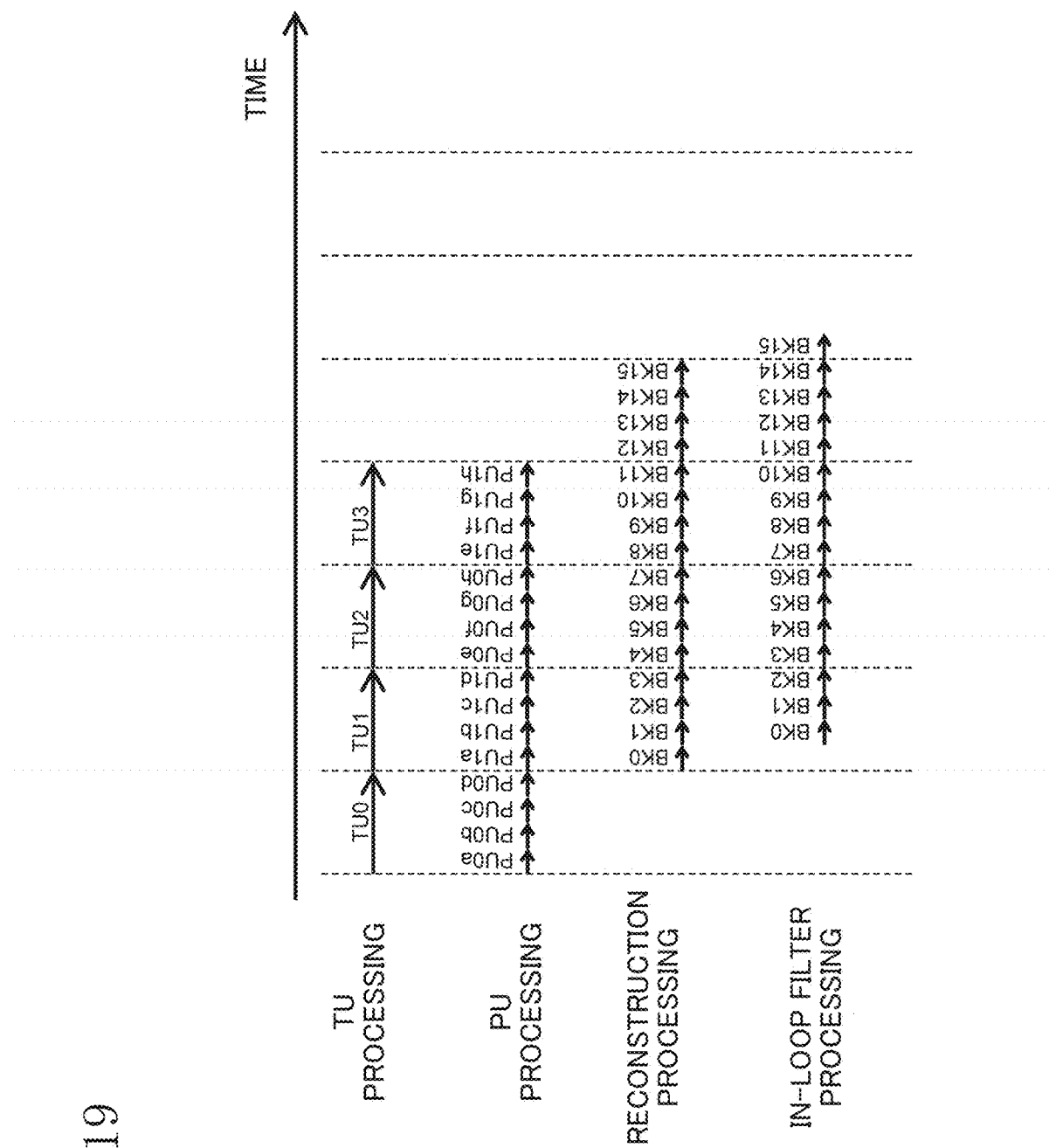
FIG. 19 is a timing chart showing how to perform pipeline processing in a situation where a PU division according to the second embodiment is carried out.

FIG. 19 is a timing chart showing how to perform pipeline processing in a situation where a PU division is carried out on the CU, TUs, PUs, and reconstructed image shown in FIG. 18 following the procedure shown in FIG. 3.

In the example illustrated in FIG. 19, TU processing is carried out on the transform units TU0, TU1, TU2, and TU3 in this order. In the meantime, PU processing is carried out in parallel on the blocks PU0a PU0h and PU1aPU1h in the order of PU0a, PU0b, PU0c, PU0d, PU1a, PU1b, PU1c, PU1d, PU0e, PU0f, PU0g, PU0h, PU1e, PU1f, PU1g, and PU1h. After that, reconstruction processing is carried out on BK0-BK15. Then in-loop filter processing is carried out on BK0-BK15.

In this case, it is not until the TU processing on TU0 is finished and until the PU processing on the blocks PU0a-PU0d is finished that the reconstruction processing on the blocks BK0-BK3 is started. In the same way, the reconstruction processing on the blocks BK4-BK7, BK8-BK11, and BK12-BK15 is started sequentially at respective timings when the TU processing on TU1-TU3 is finished in this order and when the PU processing on three sets of four blocks PU1a-PU1d, PU0e-PU0h, and PU1e-PU1h is finished in this order.

In addition, in-loop filter processing is carried out on the blocks BK0-BK15 in the order of BK0, BK1, BK2, . . . and BK15. In this case, it is not until the reconstruction processing on BK0 is finished that the in-loop filter processing on the block BK0 is started. In the same way, the in-loop filter processing on the blocks BK1-BK15 is started sequentially at respective timings when the reconstruction processing on the blocks BK1-BK15 is finished in this order.

In the example illustrated in FIG. 19, the reconstructed image is divided and processed on the basis of a processing unit consisting of 16×16 pixels, and therefore, the in-loop filter processing is also carried out on the basis of a smaller processing unit. Thus, the reconstructed image that needs to be used for the in-loop filter processing may be prepared earlier than in the situation shown in FIG. 9. Consequently, the in-loop filter processing may be started with a shorter time lag, and therefore, the decoding processing may be carried out quickly enough.

In addition, if the reconstruction processing is performed on the basis of a processing unit consisting of around 16×16 pixels which is a threshold size for PU division, a pipeline configuration similar to a conventional macroblock (of 16×16 pixels) may be adopted and processing performance comparable to the conventional one may be achieved. In addition, if a reconstruction processing unit of an even smaller size is adopted, a built-in memory between the reconstructor 140 and the in-loop filter 150 may have a smaller capacity, which thus cuts down the cost.

Third Embodiment

An image decoding device will now be described as a third embodiment of the present disclosure. In an image decoding device according to the third embodiment, the decoder 110 performs its processing in a different way from the counterpart of the first embodiment.

Figure 20:
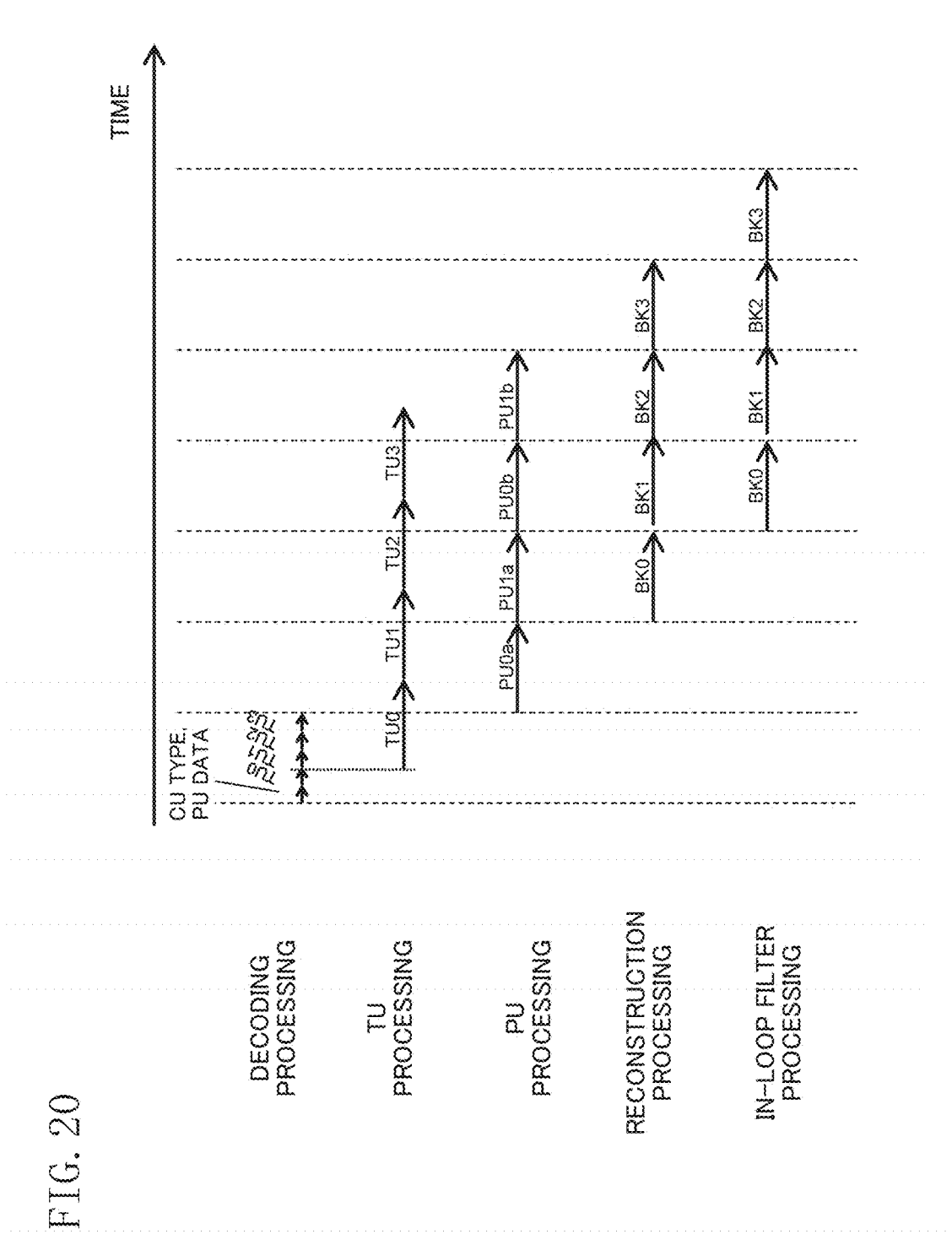
FIG. 20 is a timing chart showing how to perform pipeline processing in a situation where a conventional PU division is carried out instead of a PU division according to a third embodiment.
Figure 21:
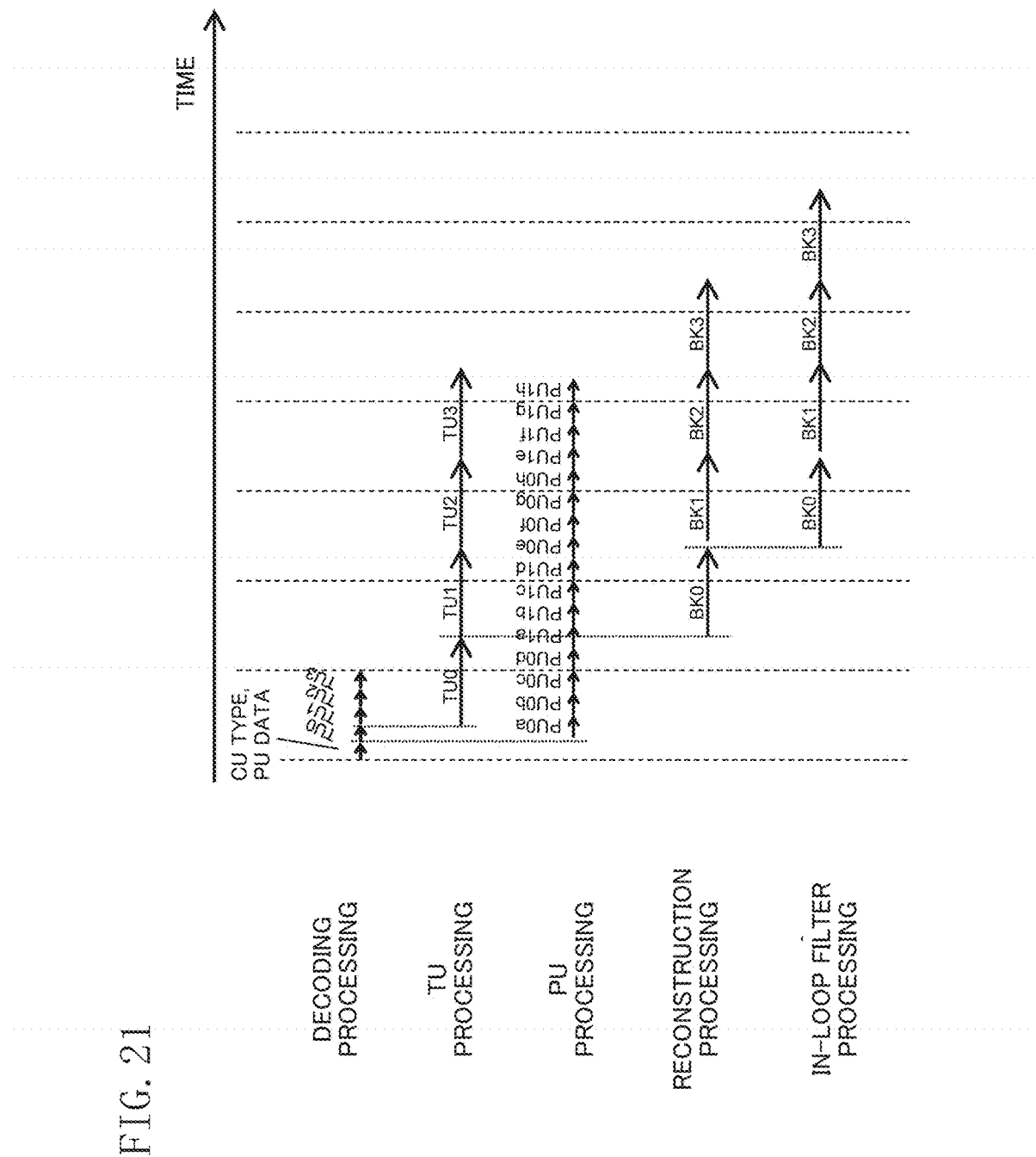
FIG. 21 is a timing chart showing how to perform pipeline processing in a situation where a PU division according to the third embodiment is carried out.
Figure 22A:
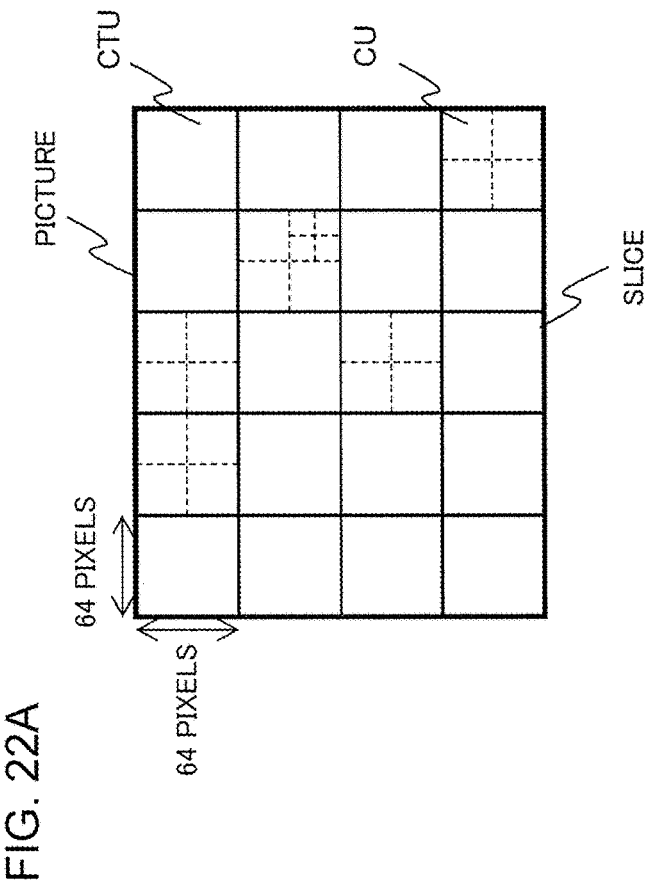
FIGS. 22A and 22B respectively illustrate an exemplary configuration for a picture and an exemplary format for a coded stream according to the H.265 standard.
Figure 22B:
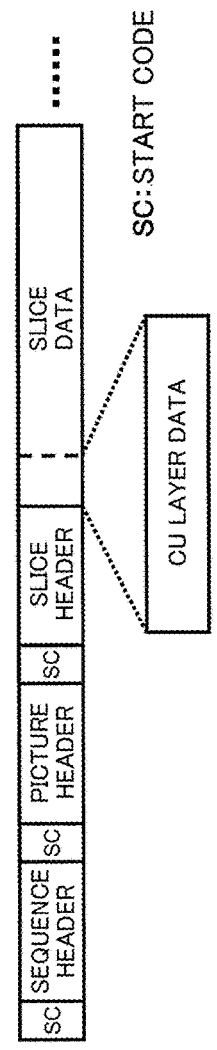
Figure 23:
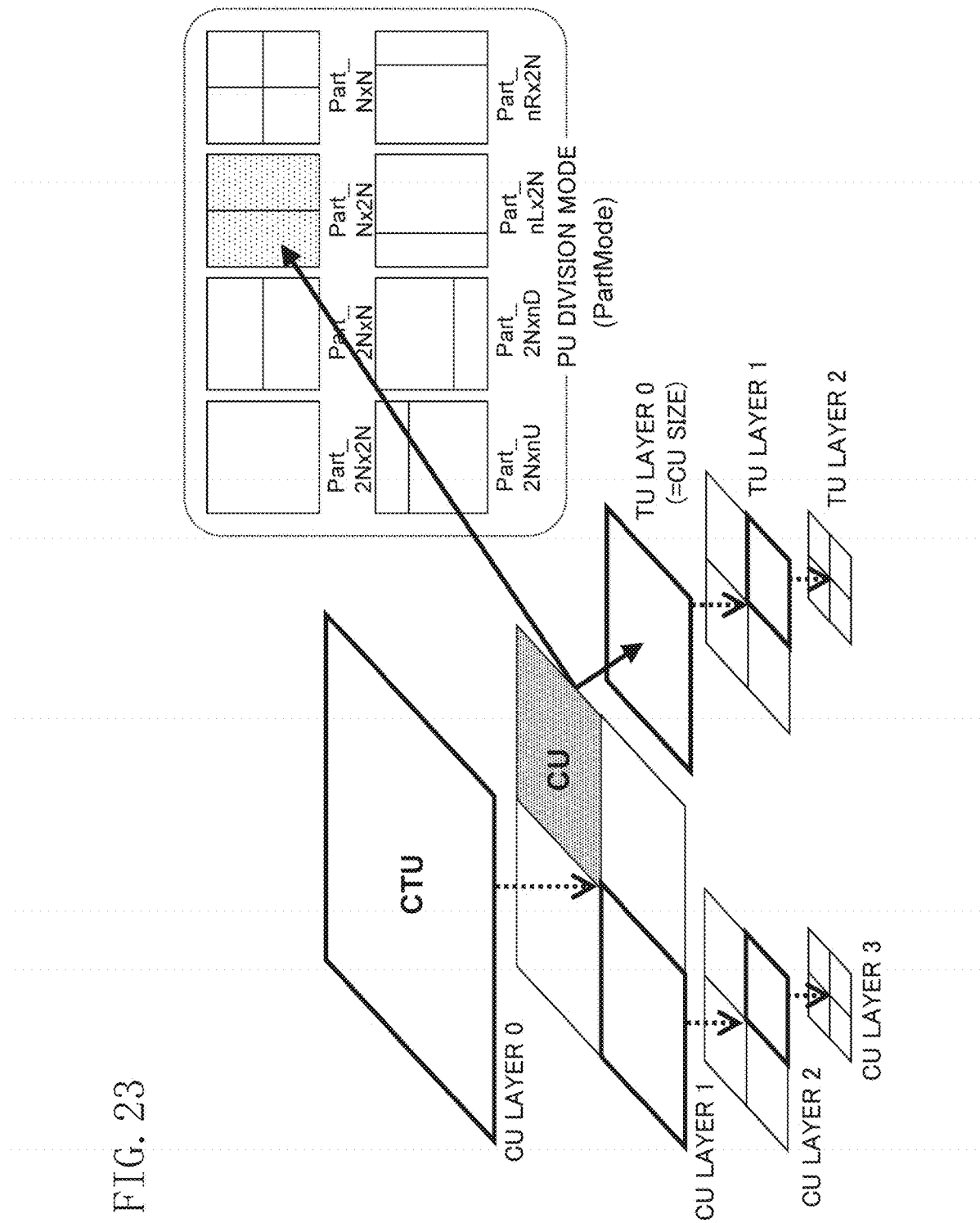
FIG. 23 illustrates how a CTU, a CU, a PU, and a TU may be defined by division according to the H.265 standard.
Figure 24A:
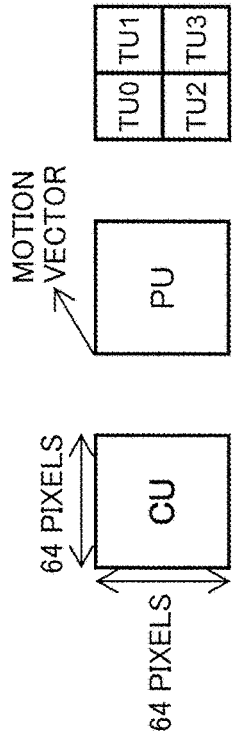
FIGS. 24A and 24B illustrate an exemplary format for a coded stream representing its CU layer data and its underlying layer data according to the H.265 standard.
Figure 24B:
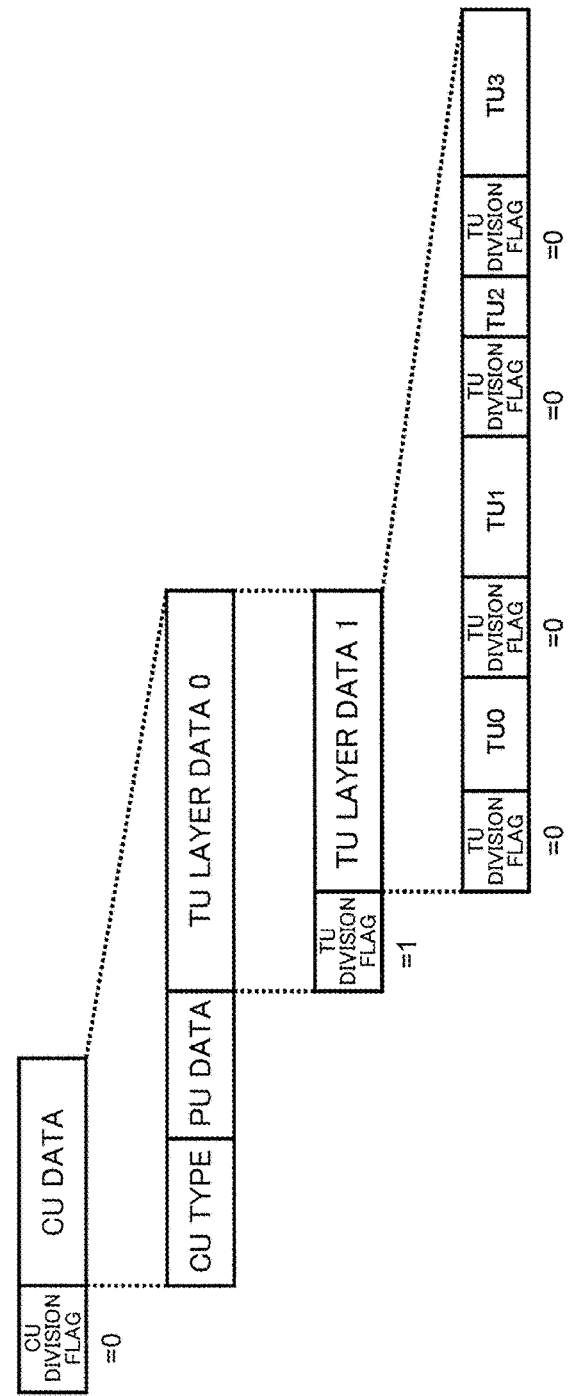

In FIGS. 20 and 21, the processing to be performed by the decoder 110 is added to the pipeline.

FIG. 20 is a timing chart showing how to perform pipeline processing according to the third embodiment in a situation where a conventional PU division is carried out on the CU, TUs, PUs, and reconstructed image shown in FIG. 6.

In the example shown in FIG. 20, the decoding processing is carried out on the CU type and PU data in terms of the PU size and prediction unit, and TU data (including a TU division flag and TU-related coefficient data) TU0, TU1, TU2, and TU3 in this order. TU processing is carried out on the transform units TU0, TU1, TU2, and TU3 in this order. PU processing is carried out on the blocks PU0a, PU0b, PU1a, and PU1b in the order of PU0a, PU1a, PU0b, and PU1b. After that, reconstruction processing is carried out on BK0-BK3. Then, in-loop filter processing is carried out on BK0-BK3.

In this case, it is not until the decoding processing on TU0 is finished that the TU processing on TU0 is started. In the same way, the TU processing on TU1-TU3 is started sequentially at respective timings when the TU processing on TU0-TU2 is finished in this order after the decoding processing on TU1-TU3 has been done.

It is not until the TU size is determined that the PU processing is started on PU blocks divided along the edges of TUs. That is to say, when the decoding processing on TU0-TU3 is finished, the PU processing on the blocks PU0a, PU1a, PU0b, and PU1b is started. In this case, it is not until the PU processing on the block PU0a is finished after the TU processing on TU0 has been done that the reconstruction processing on the block BK0 is started. In the same way, the reconstruction processing on the blocks BK1, BK2, and BK3 is started sequentially at respective timings when the PU processing on the blocks PU1a, PU0b and PU1b is finished in this order after the TU processing on the blocks TU1, TU2, and TU3 has been done in this order.

In addition, in-loop filter processing is carried out on the blocks BK0-BK3 in the order of BK0, BK1, BK2, and BK3. In this case, it is not until the reconstruction processing on the block BK0 is finished that the in-loop filter processing on the block BK0 is started. In the same way, the in-loop filter processing on the blocks BK1-BK3 is started sequentially at respective timings when the reconstruction processing on the blocks BK1-BK3 is finished in this order.

FIG. 21 is a timing chart showing how to perform pipeline processing according to the third embodiment in a situation where a PU division is carried out on the CU, TUs, PUs, and reconstructed image shown in FIG. 8 following the procedure shown in FIG. 3.

In the example shown in FIG. 21, the decoding processing is carried out on the CU type and PU data in terms of the PU size and prediction unit, and TU data (including a TU division flag and TU-related coefficient data) TU0, TU1, TU2, and TU3 in this order. TU processing is carried out on the transform units TU0, TU1, TU2, and TU3 in this order. PU processing is carried out on the blocks PU0a, PU0b, PU1a, and PU1b in the order of PU0a, PU1a, PU0b, and PU1b. After that, reconstruction processing is carried out on BK0-BK3. Then, in-loop filter processing is carried out on BK0-BK3.

In this case, it is not until the decoding processing on TU0 is finished that the TU processing on TU0 is started. In the same way, the TU processing on TU1-TU3 is started sequentially at respective timings when the TU processing on TU0-TU2 is finished in this order after the decoding processing on TU1-TU3 has been done.

It is not until the decoding processing on the CU type and PU data is finished in terms of the PU size and prediction unit that the PU processing is started on PU blocks divided irrespective of the TU size. That is to say, when the decoding processing on the CU type and PU data in terms of the PU size and prediction unit is finished, the PU processing on the blocks PU0a-PU0h and PUa-PU1h is carried out in the order of PU0a-PU0d, PU1a-PUd, PU0e-PU0h, and PU1e-PU1h. In this case, it is not until the TU processing on TU0 is finished and until the PU processing on the blocks PU0a-PU0d is finished that the reconstruction processing on the block BK0 is started. In the same way, the reconstruction processing on the blocks BK1, BK2, and BK3 is started sequentially at respective timings when the TU processing on the blocks TU1, TU2, and TU3 is finished in this order and when the PU processing on the three sets of four blocks PU1a-PU1d, PU0e-PU0h, and PU1e-PU1h is finished in this order.

In addition, in-loop filter processing is carried out on the blocks BK0-BK3 in the order of BK0, BK1, BK2, and BK3. In this case, it is not until the reconstruction processing on the block BK0 is finished that the in-loop filter processing on the block BK0 is started. In the same way, the in-loop filter processing on the blocks BK1-BK3 is started sequentially at respective timings when the reconstruction processing on the blocks BK1-BK3 is finished in this order.

In the example shown in FIG. 21, the PU processing on the prediction units is started as soon as the decoding processing on the CU type and PU data is finished. That is why both of two types of images needed for the reconstruction processing, namely, differential images and predicted images in the same area as the differential images, are all prepared earlier than in the example shown in FIG. 20. Thus, the reconstruction processing and the in-loop filter processing may be started with a decreased time lag. Consequently, the decoding processing may be speeded up.

Other Embodiments

The configuration of the first to third embodiments has been described with reference to the accompanying drawings. However, embodiments of the present disclosure are not limited to the illustrated ones but do include an implementation as a single-chip (or monolithic) LSI and an implementation as multiple separate LSIs. Furthermore, if a totally new type of integrated circuit emerges in the future as a replacement for an existent LSI as a result of advancement in semiconductor manufacturing technologies or their derivative technologies, then the functional blocks may naturally be integrated into such an integrated circuit. For example, such a new type of integrated circuit could be developed by applying biotechnologies. Alternatively, the functional blocks may also be implemented as a program running on a computer.

An image decoding device according to the present disclosure is useful as an image decoding device for decoding a coded stream that has been coded through prediction processing and its decoding method. In addition, an image decoding device according to the present disclosure is also applicable to various types of audiovisual devices such as DVD recorders, DVD players, Blu-ray disc recorders, Blu-ray disc players, and digital TV sets, and smartphones and various other types of mobile communications devices.

What is claimed is:

1. An image decoding device for decoding a coded stream which has been coded by performing coding processing on the basis of a coding unit,
   each said coding unit being comprised of: one or more prediction units functioning as units of prediction processing; or one or more transform units functioning as units of frequency transform processing,
   the coding processing including: prediction processing to be performed on the one or more prediction units; and frequency transform processing to be performed on the one or more transform units,
   the image decoding device comprising:
   a divider dividing, if the size of each said prediction unit is greater than a predetermined size, the prediction unit into a plurality of blocks irrespective of the size of each said transform unit;
   a predicted image generator generating a predicted image of the prediction unit by performing decoding processing on the predicted image on the basis of each of the plurality of blocks obtained by dividing the prediction unit; and
   an image restorer obtaining a restored image based on the predicted image generated by the predicted image generator.

2. The image decoding device of claim 1, wherein the divider divides the prediction unit to the predetermined size or less.

3. The image decoding device of claim 1, wherein the divider divides a single block, in which all of the one or more prediction units forming the coding unit are combined together, into four blocks, each having the same size, and recursively subdivides each of the divided blocks such that the size of the subdivided block becomes equal to or smaller than the predetermined size for the divider.

4. The image decoding device of claim 3, wherein the predicted image generator generates the predicted image recursively and in a Z order based on the blocks that have been subdivided recursively by the divider.

5. The image decoding device of claim 1, wherein the predetermined size for the divider is 16 pixels×16 pixels.

6. The image decoding device of claim 1, wherein the predicted image generator generates the predicted image by obtaining previously decoded image data.

7. The image decoding device of claim 1, wherein the predicted image generator generates the predicted image by retrieving previously decoded image data from an external memory.

8. The image decoding device of claim 1, wherein the predicted image generator generates the predicted image by performing motion compensation processing using a motion vector of the prediction unit based on the previously decoded image data.

9. The image decoding device of claim 1, wherein the image restorer obtains the restored image by adding a residual image subjected to inverse frequency transform processing.

10. The image decoding device of claim 1, wherein the coded stream has been coded according to the H.265 standard.

11. An image decoding method designed to decode a coded stream which has been coded by performing coding processing on the basis of a coding unit,
   each said coding unit being comprised of: one or more prediction units functioning as units of prediction processing; or one or more transform units functioning as units of frequency transform processing,
   the coding processing including: prediction processing to be performed on the one or more prediction units; and frequency transform processing to be performed on the one or more transform units, the method comprising the steps of:

dividing, if the size of each said prediction unit is greater than a predetermined size, the prediction unit into a plurality of blocks irrespective of the size of each said transform unit;

generating a predicted image of the prediction unit by performing decoding processing on the predicted image on the basis of each of the plurality of blocks obtained by dividing the prediction unit; and obtaining a restored image based on the predicted image generated in the step of generating the predicted image.

12. An integrated circuit for decoding a coded stream which has been coded by performing coding processing on the basis of a coding unit, each said coding unit being comprised of: one or more prediction units functioning as units of prediction processing; or one or more transform units functioning as units of frequency transform processing, the coding processing including: prediction processing to be performed on the one or more prediction units; and frequency transform processing to be performed on the one or more transform units, the integrated circuit comprising:

a divider dividing, if the size of each said prediction unit is greater than a predetermined size, the prediction unit into a plurality of blocks irrespective of the size of each said transform unit;

a predicted image generator generating a predicted image of the prediction unit by performing decoding processing on the predicted image on the basis of each of the plurality of blocks obtained by dividing the prediction unit; and an image restorer obtaining a restored image based on the predicted image generated by the predicted image generator.

* * * * *